United States Patent
Ohya et al.

(10) Patent No.: US 8,777,392 B2
(45) Date of Patent: Jul. 15, 2014

(54) INKJET INK AND INKJET RECORDING METHOD

(75) Inventors: Hidenobu Ohya, Tokyo (JP); Manabu Kaneko, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 410 days.

(21) Appl. No.: 13/264,771

(22) PCT Filed: Apr. 22, 2010

(86) PCT No.: PCT/JP2010/057148
§ 371 (c)(1),
(2), (4) Date: Oct. 17, 2011

(87) PCT Pub. No.: WO2010/123064
PCT Pub. Date: Oct. 28, 2010

(65) Prior Publication Data
US 2012/0033011 A1 Feb. 9, 2012

(30) Foreign Application Priority Data

Apr. 23, 2009 (JP) ................................ 2009-105066
Jun. 24, 2009 (JP) ................................ 2009-149734

(51) Int. Cl.
*B41J 2/01* (2006.01)
*B41M 5/00* (2006.01)
*C09D 11/00* (2014.01)
*B41J 2/21* (2006.01)
*B41J 2/165* (2006.01)

(52) U.S. Cl.
CPC ................ *C09D 11/40* (2013.01); *B41J 2/165* (2013.01); *B41M 5/0023* (2013.01); *C09D 11/324* (2013.01); *B41J 2/01* (2013.01); *C09D 11/322* (2013.01); *B41J 2/2107* (2013.01)
USPC .............................. 347/100; 347/95; 347/102

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101

USPC ......... 347/100, 95, 96, 101, 88, 99, 105, 102, 347/103, 21, 22; 106/31.6, 31.13, 31.27; 523/160, 161
See application file for complete search history.

(56) References Cited

U.S. PATENT DOCUMENTS

| | | | | |
|---|---|---|---|---|
| 6,087,416 | A | * | 7/2000 | Pearlstine et al. ............ 523/160 |
| 2004/0048973 | A1 | * | 3/2004 | Akutsu et al. ................ 523/160 |
| 2004/0249018 | A1 | * | 12/2004 | Kataoka et al. ............ 106/31.61 |
| 2008/0134935 | A1 | | 6/2008 | Kunimine et al. |

FOREIGN PATENT DOCUMENTS

| | | |
|---|---|---|
| JP | 2000-044858 | 2/2000 |
| JP | 2000-191974 | 7/2000 |
| JP | 2003-192956 | 7/2003 |
| JP | 2003-292838 | 10/2003 |
| JP | 2004-026946 | 1/2004 |
| JP | 2004-099800 | 4/2004 |
| JP | 2005-082751 | 3/2005 |
| JP | 2006-008797 | 1/2006 |
| JP | 2006-008798 | 1/2006 |
| JP | 2006-249393 | 9/2006 |
| JP | 2008-138064 | 6/2008 |
| JP | 2008-189793 | 8/2008 |
| JP | 2008-208153 | 9/2008 |
| WO | 2008/047592 | 4/2008 |

OTHER PUBLICATIONS

Supplemental European Search Report EP 10 76 7121.

* cited by examiner

*Primary Examiner* — Manish S Shah
(74) *Attorney, Agent, or Firm* — Lucas & Mercanti, LLP

(57) ABSTRACT

Provided is an inkjet ink including at least water, a pigment, a resin, a water-soluble organic solvent, and a surfactant, wherein the resin consist of a copolymer resin synthesized from only a (meth)acrylic monomers, and the copolymer resin has an acid value of not less than 50 mgKOH/g and not more than 200 mgKOH/g, a glass transition temperature (Tg) not less than 20 and not more than 100° C., and a weight-average molecular weight (Mw) not less than 20,000 and not more than 100,000, and as a result, a high-quality image is formed in that abrasion resistance and adhesiveness on a non-absorptive recording medium are high, glossiness is high, and there is no ink mixing, and ejection performance is good and recovery through maintenance is excellent. Also provided is an inkjet recording method that uses the same.

15 Claims, No Drawings

INKJET INK AND INKJET RECORDING METHOD

This Application is a 371 of PCT/JP2010/057148 filed Apr. 22, 2010 which, in turn, claimed the priority of Japanese Patent Application Nos. 2009-105066 filed Apr. 23, 2009 and JP2009-149734, filed Jun. 24, 2009, all three applications are incorporated by reference herein.

FIELD OF THE INVENTION

The present invention relates to a water-based inkjet recording ink and an inkjet recording method, specifically relates to an inkjet recording ink and an inkjet recording method which can be recorded on a non-absorptive recording medium.

TECHNICAL BACKGROUND

In recent years, there have been developed ink-jet inks for industrial use which can be printed directly on a non-absorptive medium such as a polyvinylchloride sheet (also referred to as a non-absorptive recording medium or a hydrophobic recording medium). Examples of these ink-jet inks are cited as: a solvent ink in which an organic solvent is used as a vehicle of an ink; and a UV ink containing a polymerizable monomer as a primary component of an ink. A solvent ink is dried by evaporating its solvent to the air, as a result, a solvent ink has a problem of emitting a large amount of VOC (Volatile Organic Compound), which becomes a social problem in recent years. There are other concerns for a worker about an odor or an effect for the safety. Therefore, it is required to provide equipment for making sufficient ventilation. A UV ink is made harden immediately after printing, therefore, an emission of VOC is close to zero, but many monomers to be used in the ink may have problem of skin sensitization. Further, there are requirement of incorporating an expensive UV light source into a printer, and it cannot be used for printers for every field. Moreover, when printed on a glossy type sheet, these inks cause extremely lusterless at the ink deposited portion, resulting in being difficult to have an image having excellent image quality.

In the above-described background, there has been developed an ink which can be printed also directly to a non-water absorptive recording medium, by using a water-based ink containing water as a major component which has been widely used in homes and has reduced effects on the environment.

There has been proposed a water-based ink containing a water miscible solvent selected from glycols and glycol ethers in Patent Document 1. Moreover, there has been proposed an ink containing a graft co-polymer binder which contains a hydrophobic backbone and a non-ionic and hydrophilic side-chain, wherein the graft co-polymer binder is soluble in a water-based vehicle and is not soluble in water. However, the inventors of the present invention studied the method disclosed in. Patent Document 1 and found that the method disclosed in Patent Document 1 resulted in insufficient image qualities such as an ink mixing caused by coalescence of ink droplets deposited adjacently on a non-absorptive recording medium and a patchy pattern caused by gathering droplets at solid image having uniform medium density or color bleeding in multi-color printing (phenomenon in which ink droplets are mixed and a smear is produced in the boundary area of the image having a different color). Further, durability of the obtained image was also insufficient. Further, ejection failure was found when continuously using inkjet head in the method of Patent Document 1. Generally, ejection failure can be recovered by maintenance with some frequency. However, recovery through maintenance in the method of Patent Document 1 did not achieve satisfactory level.

Patent Document 2 discloses that styrene-acrylic acid copolymer is added to an ink. Copolymerizable polymer containing styrene enables to have high glossiness. However, on the other hand, it often tends to reduce abrasion resistance and adhesiveness in case of an image directly printed on a hydrophobic substrate.

Copolymer between styrene and α-methyl styrene and acidic monomer such as acrylic acid is commercially available. When employing this copolymer to an inkjet ink, it enables to have high glossiness, however, it exhibits extremely bad abrasion resistance and adhesiveness. Even though reasons are not understood in detail, it is supposed that since styrene has poor adhesiveness to substrate or the film is too hard and lack of flexibility, whereby crack or peel causes in the film because of inability to follow to distortion of soft vinyl chloride.

On the other hand, all acryl type polymers without including styrene are also commercially available, in which methyl methacrylate is used instead of styrene. However, this type without including styrene has issue which tends to decrease glossiness of an image.

Patent Document 3 discloses that water-soluble acryl resin without containing styrene is added to an ink. By using a resin coated pigment as pigment dispersion, this ink enables to have a certain extent of image durability (abrasion resistance), even when directly printed on vinyl chloride substrate. However, in the market, durability against further friction is required and this ink does not enable to have enough abrasion resistance for further friction as it is now.

PRIOR TECHNICAL DOCUMENT

Patent Document

Patent Document 1: Unexamined Japanese Patent Application Publication (hereinafter referred to as JP-A) No. 2000-44858.
Patent Document 2: JP-A 2006-249393
Patent Document 3: JP-A 2008-208153

SUMMARY

Problems to be Solved by the Present Invention

In view of the foregoing, the present invention was achieved. An object of the present invention is to provide an environmentally-friendly water-based ink containing water as a major component which exhibits high abrasion resistance and adhesiveness to a non-absorptive medium, high glossiness and a high-quality image without ink mixing. Also disclosed is to provide an inkjet ink having excellent ejection stability and recovery through maintenance and an inkjet recording method by using the same.

Means to Solve the Problems

The above object has been attained by the following constitutions:
1. An inkjet ink comprising at least water, a pigment, a resin, a water-soluble organic solvent, and a surfactant, wherein the resin comprises a copolymer resin synthesized from a monomer that includes a (meth)acrylic monomer, and the copolymer resin has an acid value of not less than 50 mgKOH/g and not more than 200 mgKOH/g, a glass transition temperature (Tg) not less than 20° C. and not more than 100° C., and a weight-average molecular weight (Mw) not less than 20,000 and not more than 100,000.

2. The inkjet ink of item 1, wherein the copolymer resin is synthesized from a composition that includes monomer of (a) methyl methacrylate, (b) acrylic ester or methacrylic alkyl ester having alkyl group of 2-8 carbons and (c) acidic monomer.

3. The inkjet ink of item 1 or 2, wherein the copolymer resin is synthesized from a composition comprising (a) methyl methacrylate, (b) acrylic ester and (c) acidic monomer, and the copolymer resin has an acid value of not less than 50 mgKOH/g and not more than 150 mgKOH/g, and a glass transition temperature (Tg) not less than 30° C. and not more than 100° C.

4. The inkjet ink of item 1 or 2, wherein the copolymer resin comprising a copolymer resin synthesized from (a) methyl methacrylate, (b) acrylic ester and (c) acidic monomer, and the copolymer resin has an acid value of not less than 50 mgKOH/g and not more than 150 mgKOH/g, and a glass transition temperature (Tg) not less than 30° C. and not more than 100° C.

5. The inkjet ink of any one of items 2 to 4, wherein the acrylic ester has not less than 5 and not more than 14 carbons, and the acidic monomer is acrylic acid or methacrylic acid.

6. The inkjet ink of any one of items 2 to 5, wherein the acrylic ester is at least one selected from a group of ethyl acrylate, n-butyl acrylate, i-butyl acrylate or 2-ethylhexyl acrylate.

7. The inkjet ink of any one of items 2 to 6, wherein a mass of the acrylic ester is not less than 5% by mass and not more than 45% by mass based on a total mass of raw monomers for synthesizing the copolymer resin.

8. The inkjet ink of any one of items 1 to 7, wherein a ratio of mass of the copolymer resin to the pigment is not less than 1 and not more than 20.

9. The inkjet ink of any one of items 1 to 8 comprising amines having boiling point of not less than 100° C. and not more than 200° C. in an amount of not less than 0.2% by mass and not more than 2% by mass.

10. The inkjet ink of item 1, wherein the copolymer resin is synthesized from a composition comprising (a) methyl methacrylate, (b) methacrylic alkyl ester having alkyl group of 2-8 carbons and (c) acidic monomer.

11. The inkjet ink of item 2 or 10, wherein the methacrylic alkyl ester having alkyl group of 2-8 carbons is at least one selected from a group of ethyl methacrylate, n-butyl methacrylate, i-butyl methacrylate, t-butyl methacrylate and 2-ethylhexyl methacrylate.

12. The inkjet ink of item 10 or 11, wherein a total mass of the methacrylic alkyl ester having alkyl group of 2-8 carbons and methyl methacrylate is not less than 80% by mass and less than 90% by mass based on a total mass of the copolymer resin.

13. The inkjet ink of any one of items 10 to 12 comprising a water soluble alkanol amine in an amount of not less than 0.3% by mass and not more than 2.0% by mass.

14. The inkjet ink of any one of items 10 to 13, wherein a monomer composition for synthesizing the copolymer resin has a total mass of methacrylic alkyl ester having alkyl group of 2-8 carbons, methyl methacrylate, and acidic monomer in an amount of not less than 80% by mass and not more than 100% by mass based on a total mass of the copolymer resin.

15. The inkjet ink of any one of items 1 to 14, wherein the surfactant is silicone based or fluorine based surfactant.

16. An inkjet recording method comprising steps of printing the inkjet ink of any one of items 1 to 15 onto a non-absorptive recording medium heated at not less than 35° C. and less than 55° C., and heat-drying the printed inkjet ink at not less than 55° C. and not more than 90° C.

Effects of the Invention

The present invention made it possible to provide inkjet ink which exhibits high abrasion resistance and adhesiveness to a non-absorptive medium, high glossiness and a high-quality image without ink mixing as well as having excellent ejection stability and head recovery through maintenance and an inkjet recording method by using the same.

PREFERRED EMBODIMENT OF THE INVENTION

An optimal embodiment to practice the present invention will now be detailed.

The inventors of the present invention conducted diligent investigations about a water-based pigment ink so as to form a high-quality image without ink mixing even printing onto various resin substrate such as vinyl chloride sheet for sign use or paper substrate having slow absorption such as printing paper, and an image exhibiting high glossiness, high abrasion resistance and adhesiveness, as well as having excellent ejection stability and head recovery through maintenance.

(Non-Absorptive Recording Medium)

The non-absorptive recording medium described above is referred to as a recording medium comprising hydrophobic resin such as vinyl chloride, PET, polypropylene, polyethylene, or polycarbonate which absorbs little water, or a recording medium such as printing paper such as coat paper which absorbs water to some extent but absorption rate is too slow to dry the water-based ink in a general inkjet printing process in an environment of ordinary temperatures and humidity, resulting in problem for drying.

(Pigment)

Pigment utilizable in this invention includes an organic and an inorganic pigment conventionally well known in the art. For example, listed are an azo pigment such as an azo lake, insoluble azo pigment, condensed azo pigment and chelate azo pigment; a polycyclic pigment such as a phthalocyanin pigment, perylene and perylene pigment, anthraquinone pigment, quinacridone pigment, dioxadine pigment, thioindigo pigment, isoindolinone pigment and quinophthalone pigment; a dye lake such as a basic dye type lake, and acidic dye type lake; an organic pigment such as a nitro pigment, nitroso pigment, aniline black and daylight fluorescent pigment; and an inorganic pigment such as a carbon black.

As specific pigments which are preferably usable, the following pigments are listed:

As magenta or red pigments, listed are, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

As orange or yellow pigments, listed are, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, and C.I. Pigment Yellow 138.

As green or cyan pigments, listed are, for example, C.I. Pigment Blue 15, C.I. Pigment Blue 15:2, C.I. Pigment Blue 15:3, C.I. Pigment Blue 16, C.I. Pigment Blue 60, and C.I. Pigment Green 7.

(Pigment Dispersion)

So as to maintain stable dispersion of above pigment in a water-based ink, various treatments are carried out to prepare pigment dispersion.

The dispersion may be any one provided being stably dispersible in a water phase and can be selected from such as a pigment dispersion in which a pigment is dispersed by polymer resin, capsule pigment in which a pigment is covered with a water insoluble resin, self-dispersible pigment in which the surface of a pigment is modified to be dispersible without a dispersion resin.

In the case of utilizing a pigment dispersion in which a pigment is dispersed with a polymer resin, those being water soluble may be utilized as a polymer resin. A water-soluble resin preferably utilized includes such as styrene-acrylic acid-acrylic acid alkyl ester copolymer, styrene-acrylic acid copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid half ester copolymer, vinyl naphthalene-acrylic acid copolymer and vinyl naphthalene-maleic acid copolymer.

Further, a pigment may be dispersed with the copolymer resin described above as dispersing resin of pigment.

As for a dispersion method of a pigment, various types such as a ball mill, a sand mill, an atliter, a roll mill, an agitator, a Henschel mixer, a colloidal mill, a ultrasonic homogenizer, a pearl mill, a wet-type jet mill and a paint shaker can be utilized.

In this invention, it is also preferable to utilize a centrifugal separator or to utilize a filter for elimination of coarse particles in pigment dispersion.

Further, in the case of utilizing capsule pigment in which a pigment is covered with a water-insoluble resin, a water-insoluble resin refers to a resin which is insoluble in water in a range of weak acidic to weak basic, and preferably the solubility of which against aqueous solution of pH 4-10 is less than 2%.

Such a resin includes each resin of such as an acryl type, a styrene-acryl type, an acrylonitrile-acryl type, a vinyl acetate type, a vinyl acetate-acryl type, a vinyl acetate-vinyl chloride type, a polyurethane type, a silicone-acryl type, an acryl silicone type, a polyester type and an epoxy type.

The dispersing resin or the water-non-soluble resin preferably has a weight-average molecular weight of from 3,000 to 500,000, more preferably from 7,000 to 200,000.

The dispersing resin or the water-non-soluble resin preferably has a glass transition temperature (Tg) from about −30° C. to 100° C., more preferably from about −10° C. to 80° C.

Mass ratio of pigment to resin for dispersing pigment is preferably selected in the range of not less than 100/150 and not more than 100/30, represented by Pigment/Resin ratio. Specifically, good durability of the image, ejecting stability and ink storage stability are exhibited in the range of not less than 100/100 and not more than 100/40.

The average particle diameter of the pigment particles which are coated by non-water-soluble resin is preferably about 80 to 150 nm, in terms of ink storage stability and color forming properties.

Various conventional methods are applicable as a method for coating pigment by non-water-soluble resin. Preferable is a method in which non-water-soluble resin is dissolved in organic solvent such as methyl ethyl ketone, followed by partially or completely neutralizing acid group in the resin by base. Then pigment and ion-exchanged water are added and dispersed. After eliminating organic solvent, water is added to arrange as appropriate. Or preferable is a method in which pigment is dispersed by using polymerizable surfactant, and coated while polymerization is carried out by supplying monomer thereto.

Further, self-dispersing pigment which is surface treated available on the market may be applicable. Specific examples of preferable self-dispersing pigments include CAB-JET 200, CABO-JET 300 (produced by Cabot Corporation), and BONJET CW1 (produced by Orient Chemical Industries Co., Ltd).

(Organic Solvent)

Organic solvent having low surface tension may be preferably added to the ink of the present invention.

Addition of organic solvent having low surface tension enables to inhibit ink mixing more even to a recording medium made of various hydrophobic resins such as soft vinyl chloride sheet, or a paper support having low ink absorption such as printing paper, resulting in having high quality print images. It is considered that the organic solvent having low surface tension functions to improve ink wettability to vinyl chloride, as well as the copolymer resin functions to increase ink viscosity according to drying water in ink.

Especially glycol ethers or 1,2-alkanediols is preferably added to the ink used for the present invention. Specifically preferred is to employ following water-soluble organic solvent (figure in parenthesis represents surface tension).

Specific examples of glycolethers include ethylene glycol monoethyl ether (28.2), ethylene glycol monobutyl ether (27.4), diethylene glycol monoethyl ether (31.8), diethylene glycol monobutyl ether (33.6), triethylene glycol monobutyl ether (32.1); propyleneglycol monopropyl ether (25.9), dipropylene glycol monomethyl ether (28.8); and tripropylene glycol monomethyl ether (30.0).

Specific examples of 1,2-alkanediols include 1,2-butanediol, 1,2-pentanediol, 1,2-hexanediol (28.1), and 1,2-heptanediol.

Further, preferred is addition of solvent capable of dissolving, softening or swelling a recording medium such as vinyl chloride, because it enables to enhance adhesiveness between vinyl chloride and the copolymer resin, whereby enhances adhesiveness and abrasion resistance of image.

These solvents include cyclic solvents containing a nitrogen atom, cyclic ester solvents, lactic acid esters, alkyleneglycol diether, alkyleneglycol monoether monoester and dimethyl sulfoxide.

Specific examples of preferable cyclic solvent containing a nitrogen atom is a cyclic amide compound and a 5-7-member ring, and includes such as 2-pyrrolidone, N-methyl-2-pyrrolidone, N-ethyl-2-pyrrolidone, 1,3-dimethyl-2-imizolidinone, ε-caprolactam, methyl caprolactam and 2-azacyclooctanone.

The cyclic solvent containing a sulfur atom is preferably a 5-7-member ring and includes such as sulforane.

Specific example of the cyclic ester solvent includes such as γ-butyllactone and ε-caprolactone; specific example of the lactic acid ester includes butyl lactate and ethyl lactate.

Specific example of the alkyleneglycol diether includes diethyleneglycol diethylether.

Specific example of the alkyleneglycol monoether monoester includes diethyleneglycol monoethyl monoacetate.

Other than above, as a water-soluble solvent is preferable, listed are alcohols (such as methanol, ethanol, propanol, isopropanol, butanol, isobutanol, secondary butanol, and tertiary butanol), polyhydric alcohols (such as ethylene glycol, diethylene glycol, triethylene glycol, polyethylene glycol, propylene glycol, dipropylene glycol, polypropylene glycol, butylenes glycol, hexanediol, pentanediol, glycerin, hexanetriol and thioglycol), amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine and tetramethylpropylenediamine), and amides (such as formamide, N,N-dimethylformamide and N,N-dimethylacetoamide).

(Surfactant)

Next, silicone type or fluorine type surfactant will be described.

Addition of silicone type or fluorine type surfactant as the surfactant enables to inhibit ink mixing more even to a recording medium made of various hydrophobic resins such as soft vinyl chloride sheet, or a paper support having low ink absorption such as printing paper, resulting in having high quality print images. The surfactant is employed preferably in combination with the water-soluble organic solvent having low surface tension.

The silicone type surfactant is preferable polyether modified polysiloxane, and includes KF-351A and KF-642 produced by Shin-Etsu Chemical Co., Ltd.; and BYK347 and BYK348 produced by BYK-Chemie GmbH.

Fluorine type surfactant is a surfactant in which a part or all of hydrogen atoms bonded to carbon atom in hydrophobic group of general surfactant are replaced by fluorine atom. Of these, fluorine type surfactant having a perfluoro alkyl group is preferably used.

Examples of fluorine type surfactant are commercially available as "Megafac F" from Dainippon Ink and Chemicals, Inc., "Surflon" from Asahi glass Co., Ltd., "Fluorad FC" from Minnesota Mining and Manufacturing, "Monflor" from Imperial Chemical Industries, "Zonyls" from E.I. DuPont as well as "Licowet VPF" from Farbwerke Heochest AG under the trade names.

According to species of hydrophilic group, fluorine type surfactants are classified into anionic, cationic and nonionic type surfactant, and nonionic type surfactant can be preferably employed.

Preferable specific examples of nonionic fluorine type surfactant include Megafac 144D produced by Dainippon ink, and Surflon S-141 produced by Asahi glass. As amphoteric fluorine type surfactant, listed are Surflon S-131 and 132 produced by Asahi glass.

Silicone type or fluorine type surfactant may be employed in combination with following surfactants.

Specific examples include anionic surfactants such as dialkylsulfosuccinic acid salts, alkylnaphthalene sulfonic acid salts; nonionic surfactants such as polyoxyethylene alkylethers, polyoxyethylene alkylarylethers, acetyleneglycols, polyoxyethylene-polyoxypropylene block copolymers; cationic surfactants such as alkyl amine salts, and quaternary ammonium salts. Of these, anionic and nonionic surfactants can be preferably employed.

(Heating of Recording Medium)

By employing the water-based inkjet ink of the present invention, it enables to print a high-quality image without ink mixing on the non-absorptive recording medium, whereby to form excellent image having high glossiness, high abrasion resistance and adhesiveness.

In terms of forming higher quality image having abrasion resistance and adhesiveness and corresponding to faster printing conditions, printing is preferably performed while heating a recording medium at not less than 35° C. and less than 55° C. At more than 55° C., it caused problems such that a recording medium made of vinyl chloride tends to be deformed to be undulated and ejection becomes unstable due to drying ink at head.

Further, it is more preferable that print is heat-dried at not less than 55° C. and less than 90° C. after printing while heating, because heating after printing enables to accelerate drying as well as enhancing adhesiveness between the copolymer resin and the non-absorptive recording medium.

This effect is specifically obtained when printing onto the non-absorptive recording medium. When an organic solvent has relatively higher boiling point than water in an ink, sometimes the organic solvent cannot be dried and remains on a surface of printing side. The residual solvent exists in combination with copolymer resin on the printing surface and sometimes causes insufficient film-forming and curing of the copolymer resin, whereby resulting in decreasing abrasion resistance or adhesiveness. When further heat-drying is carried out after printing, the residual solvent on the non-absorptive recording medium can be eliminated, whereby abrasion resistance and adhesiveness can be enhanced more.

As for the heating temperature, heating is preferably performed at not less than 55° C. in terms of accelerating a elimination of residual solvent and at less than 90° C. in terms of inhibiting deformation of a recording medium by heating.

When using an absorptive recording medium such as paper, a residual solvent can be absorbed into the recording medium and does not remain at the surface of printing side, whereby above phenomena does not occur.

As for a specific heat-drying method, listed are a method in which heating is performed by heater after printing from a back side of a recording medium, a method in which heating is performed by a warm air blow from a printing side of a recording medium, or a method in which heating of a recording medium is performed by radiation heat of infrared ray by use of such as a halogen lamp.

(Copolymer Resin)

The copolymer resin functions as binder of pigment colorant to have adhesiveness to a non-absorptive recording medium such as vinyl chloride and also functions to enhance abrasion resistance of layer.

The copolymer resin has to function to form an image having high glossiness and high optical density. Therefore, the copolymer itself is required to have high transparency in the layer and miscibility with pigment or pigment dispersing resin.

Further, printed image having high quality without ink mixing is necessary even when printed onto various non-absorptive recording medium such as vinyl chloride sheet. The inventor of the present invention found that two factors were necessary to reduce ink mixing. One factor is a wettability of ink onto a substrate. Another one is ease of viscosity increase after ink depositing onto a substrate. Resin for ink must not drastically degrade a wettability of ink and must increase viscosity in drying process as soon as possible after ink deposition.

Further, it is required that an addition of resin to an ink must not deteriorate an ejection performance. Even when continuous print or continuous pose causes to deteriorate an ejection performance, it must be easily recovered to the initial ejection state by maintenance.

As described above, for addition of resin to ink, the resin has to be designed and selected to have enough effects in various purposes.

In view of the foregoing, the inventors of the present invention conducted diligent investigations with respect to various resins. As a result, the following was discovered, and the present invention was achieved. That is, an ink having acrylic type copolymer resin with low acid value exhibits excellent abrasion resistance and the copolymer resin having relatively high molecular weight exhibits less ink mixing.

As is well known in the art, since acryl resin can be selected and designed freely from extremely various type of monomers and be easily polymerized and produced in low cost, it is suitable to the present invention.

Acryl resin available in the market includes water-dispersion type acryl emulsion and water soluble resin. Emulsion type has advantage generally to have higher molecular weight than water soluble type, resulting in forming film having enhanced strength. On the contrary, once film is dried, it cannot be dissolved into water. Therefore, since dried ink on the head cannot be eliminated by dissolving and has to be physically scraped away, thereby maintenance tends to become difficult. Therefore, the copolymer resin is preferable water soluble resin.

The (meth)acryl based monomer refers to a monomer comprising (meth)acrylic acidic monomer and a derivatives thereof. Specific examples of (meth)acryl based monomer include (meth)acrylic acid, (meth)acrylic acid esters, and (meth)acrylamides. Of these, (meth)acrylic acid and (meth)acrylic acid esters are preferably used.

The copolymer resin is synthesized from a monomer that includes a (meth)acrylic based monomer, and the copolymer resin has an acid value of not less than 50 mgKOH/g and not more than 200 mgKOH/g, a glass transition temperature (Tg) of not less than 20° C. and not more than 100° C., and a weight-average molecular weight (Mw) of not less than 20,000 and not more than 100,000.

Composition comprising (meth)acrylic based monomer preferably includes monomer of (a) methyl methacrylate, (b) acrylic ester or methacrylic alkyl ester having alkyl group of 2-8 carbons and (c) acidic monomer.

Methyl methacrylate is preferably added in an amount of 15-90% by mass based on a mass of total monomers comprising raw materials of the copolymer resin.

The acidic monomer includes acrylic acid, methacrylic acid, itaconic acid, maleic acid, and maleic acid half ester. Of these, acrylic acid and methacrylic acid are preferable, in terms of high ejection stability and excellent maintenance property.

One of features of the copolymer resin related to the present invention is to have an acid value of not less than 50 mgKOH/g and not more than 200 mgKOH/g. When a resin has acid value of not less than 50 mgKOH/g, since a resin can be eliminated by resolution or physical rubbing process even when drying causes at nozzle of inkjet head, thereby excellent maintenance property can be applied. Further, in case of acid value being not more than 200 mgKOH/g, excellent abrasion resistance, adhesiveness and glossiness can be obtained.

Further, one of features of the copolymer resin related to the present invention is to have a glass transition temperature (Tg) of not less than 20° C. and not more than 100° C. In case of Tg being not less than 20° C., excellent abrasion resistance can be obtained as well as blocking is inhibited. In case of Tg being less than 100° C., excellent adhesiveness of image film can be maintained.

One of features of the copolymer resin related to the present invention is to have a weight-average molecular weight (Mw) not less than 20,000 and not more than 100,000. In case of weight-average molecular weight of the copolymer resin being not less than 20,000, enough abrasion resistance can be obtained. In case of weight-average molecular weight being not more than 100,000, excellent ejection stability and maintenance property can be obtained.

Content of the copolymer resin is preferable not less than 1% by mass and not more than 15% by mass based on a total ink mass, more preferable not less than 2% by mass and not more than 10% by mass.

In the case when the copolymer resin has a mass ratio to pigment solid being more than 1 time, excellent abrasion resistance, adhesiveness and glossiness of the image can be obtained. In case of a mass ratio being not more than 20 times, ejection stability and maintenance property cannot be become impaired. More preferably, a mass ratio is not less than 1 time and not more than 10 times.

(Neutralization of Resin)

In the copolymer resin, a portion corresponding to acidic monomer may be neutralized partially or completely by using base. Bases for neutralizing acidic group include a base containing alkali metal (for example, NaOH and KOH), amines (for example, alkanol amines and alkyl amines) or ammonia.

In view of enhancing durability of image and inhibiting ink mixing, it is preferable to neutralize by using amines having boiling point of not more than 200° C.

Next, a case of using acrylic acid ester as monomer (b) of the copolymer resin will be detailed.

Methacrylic acid is preferably added in an amount of 15-90% by mass based on a mass of total monomers comprising raw materials of the copolymer resin.

As for the acrylic acid ester, one or a plurality species of monomers may be copolymerized. Carbon numbers of acrylic acid ester are preferably not less than 5. Since carbon chain in ester portion is long, thereby copolymer resin in the ink and the recording medium made of hydrophobic resin are closely adhered, resulting in enhancing abrasion resistance or adhesiveness. Further, carbon numbers of acrylic acid ester are preferably not more than 14, in terms of ejection stability.

Preferable examples of acrylic acid ester include ethyl acrylate, propyl acrylate, n-butyl acrylate, i-butyl acrylate, n-hexyl acrylate, n-octyl acrylate, and 2-ethylhexyl acrylate. Of these, ethyl acrylate, n-butyl acrylate, i-butyl acrylate, and 2-ethylhexyl acrylate are preferable, in terms of high abrasion resistance or adhesiveness, resulting in stable ejection.

Further, a mass ratio of the acrylic acid ester is preferable not less than 5% and not more than 45% based on a mass of total monomers comprising the copolymer resin. In case of the mass ratio of the acrylic acid ester being not less than 5%, adhesiveness to a recording medium made of hydrophobic resin can be high. In case of the mass ratio of the acrylic acid ester being not more than 45%, excellent ejection can be obtained.

The copolymer resin preferably has an acid value of not less than 50 mgKOH/g and not more than 150 mgKOH/g.

The inventor of the present invention conducted detail investigations about various resins and found that there is close relationship between acid value of resin and abrasion resistance or adhesiveness such that the lower is the acid value of resin, the higher are abrasion resistance and adhesiveness. It is supposed that in case of acid value of resin being high, the resin becomes hydrophilic and affinity to the hydrophobic substrate becomes low, resulting in being difficult to adhere between the resin and the substrate. On the contrary, in ease of acid value of resin being low, the resin becomes hydrophobic and affinity to the hydrophobic substrate becomes high, resulting in enhancing to adhere between the resin and the substrate.

Further, there is relationship between acid value of resin and ejection property of ink or maintenance property. In case of excessive low acid value, since dried ink on the head cannot be eliminated by dissolving and has to be physically scraped away, thereby maintenance tends to become difficult.

Further, acid value of resin has effect to ink mixing or glossiness. In case of excessive high acid value, it tends to result in deterioration of ink mixing or glossiness.

From above, an acid value of the copolymer resin is preferable not less than 50 mgKOH/g and not more than 150 mgKOH/g, more preferable not less than 60 mgKOH/g and not more than 100 mgKOH/g.

Further, the copolymer resin preferably has a glass transition temperature (Tg) of not less than 30° C. and not more than 100° C. In case of Tg being less than 30° C., abrasion resistance is insufficient and sometimes blocking may occur. In case of Tg being higher than 100° C., abrasion resistance becomes extremely deteriorated. It is supposed that a film after drying becomes too hard to be brittle. Glass transition temperature (Tg) of the copolymer resin can be arranged by species and composition ratio of monomers used for copolymerization.

Weight-average molecular weight (Mw) of the copolymer resin is not less than 20,000 and not more than 100,000. In case of weight-average molecular weight being not less than 20,000, abrasion resistance becomes better. In case of weight-average molecular weight being not more than 100,000, ink ejection or maintenance property becomes excellent. More preferable weight-average molecular weight of the copolymer resin is not less than 25,000 and not more than 70,000.

Further, weight-average molecular weight of the copolymer resin has effect to ink mixing. In case of excessive small, ink mixing performance becomes worse. Ink mixing refers to a phenomenon in which adjacently deposited ink droplets contact each other to mix during the time from deposition to drying, resulting in deforming dot shapes or mixing colors which causes deterioration of image quality. In order to inhibit this ink mixing, it is necessary to inhibit mixing between adjacently deposited ink droplets by quickly drying after ink deposition onto the substrate. The inventors of the present invention consider that weight average molecular weight relates to an increase of viscosity during drying process after ink deposition. The larger is a weight average molecular weight, viscosity may increase more easily, whereby ink mixing can be inhibited. In case of weight average molecular weight being not less than 20,000, less deterioration of images occurs.

Weight average molecular weight of the copolymer resin can be arranged by polymerization reaction conditions such as concentration of monomers or content of initiator. For example, weight average molecular weight can be larger by using higher concentrated monomer. Or weight average molecular weight can be smaller by increasing a content of initiator.

The copolymer resin may be added before dispersing pigment, or after dispersing process. Of these, addition after dispersing process is preferred.

The copolymer resin is preferably added 1%-15% by mass in ink, more preferably 3%-10% by mass.

In the inkjet ink of the present invention, a resin other than the copolymer resin may be employed in combination. Preferable content ratio of the copolymer resin to total resin containing in the ink is not less than 25% by mass and not more than 100% by mass.

(Neutralization of Resin)

Specifically preferred is a neutralization by using amines having boiling point of not less than 100° C. and not more than 200° C., in terms of dissolving the copolymer resin into the ink, enhancing image durability, or inhibiting ink mixing. Neutralization by N,N-dimethylamino ethanol and 2-amino-2-methylpropanol are preferable, in terms of ejection stability.

Content of base for neutralization depends on an amount of acidic monomer containing in the copolymer resin. In case of content being excessive small, an effect of neutralization of the copolymer resin cannot be obtained. In case of content being excessive large, it causes problems such as water resistance, color change or odor of the image. Therefore, preferable content is not less than 0.2% and not more than 2% in ink.

Subsequently, the case of using alkyl methacrylate ester having 2-8 carbons in alkyl group as the monomer (b) in the copolymer resin will now be specifically described One of features of the copolymer resin related to the present invention is to have a total mass of methacrylic alkyl ester having alkyl group of 2-8 carbons, methyl methacrylate, and acidic monomer in an amount of not less than 80% by mass and not more than 100% by mass based on a total mass of the copolymer resin. In case of total mass being not less than 80% by mass, intended abrasion resistance and adhesiveness can be obtained. Although the factor is not cleared yet, it is supposed that copolymer resin comprising three component of methacrylic alkyl ester having alkyl group of 28 carbons, methyl methacrylate and acidic monomer can co-exist stably with various water based pigment dispersion and can form highly uniform coating layer, resulting in exhibiting less glossiness deterioration.

Further, since methacrylic alkyl ester having alkyl group of 2-8 carbons can enhance adhesiveness to the substrate, thereby high abrasion resistance and adhesiveness can be exhibited. On the contrary, when large amount of styrene or styrene having substituent is added, adhesiveness to the substrate decreases and abrasion resistance and adhesiveness extremely decreases. Further, in case of carbon number of alkyl group in methacrylic alkyl ester being not less than 9, ejection stability becomes deteriorated. Therefore these conditions are undesired.

One of features of the copolymer resin related to the present invention is to have a weight-average molecular weight (Mw) not less than 20,000 and not more than 100,000, preferably less than 100,000. In view of enhancing all of abrasion resistance, ejection stability and maintenance property, a weight-average molecular weight is preferable not less than 30,000 and less than 60,000.

The copolymer resin related to the present invention will now be detailed.

As for copolymerizable monomer in the copolymer resin related to the present invention, other copolymerizable monomer may be appropriately added in the range of less than 20% based on the total copolymer resin composition comprising monomers of methacrylic alkyl ester having alkyl group of 2-8 carbons, methyl methacrylate, and acidic monomer.

In the copolymer resin related to the present invention, it is preferable to copolymerize methyl methacrylate in the range of from not less than 20% by mass to not more than 50% by mass based on the total mass of the copolymer resin, in view of enhancing abrasion resistance and adhesiveness.

Further, methacrylic alkyl ester having alkyl group of 2-8 carbons is preferably at least one selected from a group of ethyl methacrylate, n-butyl methacrylate, i-butyl methacrylate, t-butyl methacrylate and 2-ethylhexyl methacrylate. Further, one or a plurality of methacrylic alkyl esters having alkyl group of 2-8 carbons may be copolymerized. Of these, at least one of ethyl methacrylate and n-butyl methacrylate is preferably copolymerized, in view of enhancing ejection stability.

Methacrylic alkyl ester having alkyl group of 2-8 carbons is preferably copolymerized in the range of from not less than 25% by mass to less than 70% by mass based on the total mass of the copolymer resin, in view of enhancing abrasion resistance and adhesiveness.

In the copolymer resin related to the present invention, methacrylic alkyl ester having alkyl group of 2-8 carbons is preferably copolymerized in the range of from not less than 80% by mass to less than 90% by mass based on the total mass of the copolymer resin, in view of forming film having excellent abrasion resistance and adhesiveness.

Further, in the copolymer resin related to the present invention, employable may be a monomer in which a portion corresponding to acidic monomer may be neutralized partially or completely by using alkali. Of these, acidic monomer neutralized by ammonia is preferable, since drying is fast after printing, thereby printed matter can be stacked immediately after printing, as well as preventing ink mixing. As for a counter salt, N-dimethylaminoethanol, 2-amino-2-methylpropanol and N-methylaminoethanol is preferably employed, in view of stable ejection.

The copolymer resin related to the present invention can be provided according to a conventional method for synthesizing polymer. Example of synthesizing method of the copolymer resin relating to the present invention will be described below.

(Synthesis of Copolymer Resin Comprising n-Butyl Methacrylate: Methyl Methacrylate: and Methacrylic Acid (Mass Ratio of 39:46:15))

Into 500 ml of a four-neck flask provided with a mechanical stirrer, a nitrogen gas directing tube, a condenser, and a dropping funnel, were loaded 185 g of isopropyl alcohol, and heated to reflux, while bubbling a nitrogen gas. Into the dropping funnel, 46 g of methyl methacrylate, 39 g of n-butyl methacrylate, 15 g of methacrylic acid and 0.5 g of azobisisobutyronitrile (AIBN) as an initiator were dissolved in mixture, and the mixture was dropped for about 2 hours in a state of heated to reflux. After finishing dropping, further heated to reflux for 6 hours, and isopropyl alcohol solution containing 0.05 g of AIBN was dropped for 15 minutes. Thereafter, resulting solution was heated to reflux for further 5 hours.

After standing to cool the reaction solution, isopropyl alcohol was distilled away under reducing pressure. Into a residue, 12.4 g of 28% ammonia water as base for alkali neutralization and 553 g of ion exchanged water were added and heated, stirred to dissolve, whereby prepared was an ammonia salt of copolymer resin. Solid content of the copolymer resin was about 15% by mass. Acid value of the copolymer resin was determined by acid value measurement according to JIS K-0070 Acid value measurement by hydrolysis (total acid value measurement) to be 102 mg KOH/g. Glass transition temperature determined by DSC was 79° C. Weight average molecular weight was determined by GPC measurement to be 46,000. Measurement method for each property was detailed in the following Examples.

The copolymer resin of the present invention is preferably added 1 to 4 times by mass based on a solid content of pigment.

(Pigment Dispersion)

Any pigment which can be stably dispersible in water may be employed to the present invention. In case of valuing ink storage stability, it is preferred to select capsule pigment covered with a water-insoluble resin.

Specific examples of hydrophobic monomer for preparing capsule pigment include acrylic esters (for example, butyl acrylate, 2-ethylhexyl acrylate, or 2-hydroxyethyl acrylate), methacrylic esters (for example, ethyl methacrylate, butyl methacrylate, or glycigyl methacrylate), and styrene. Specific examples of hydrophilic monomer include acrylic acid, methacrylic acid and acrylamide. Of these, one having acidic group such as acrylic acid may be preferably employed by neutralizing after polymerization.

As molecular weight of water insoluble resin, resin having weight average molecular weight of 3,000 to 500,000 are employable, preferable 7,000 to 200,000.

As Tg of water insoluble resin, resin having −30° C. to 100° C. are employable, preferable −10° C. to 80° C.

Solution polymerization method or emulsion polymerization method can be employable as polymerization method. Polymerization may be preliminarily carried out separately from pigment, or by supplying monomer into dispersed pigment.

Various conventional methods can be employed for covering pigment by water insoluble resin.

Other than phase inversion emulsification method or acid deposition method, it is preferable to select a method in which pigment is dispersed by using polymerizable surfactant, and monomer is supplied thereto and covers while polymerizing.

As more preferable method for covering pigment by water insoluble resin, listed is the following method in which water insoluble resin is dissolved in organic solvent such as methyl ethyl ketone, and acid group in the resin is neutralized partially or completely by using base. Then, pigment and ion exchanged water are added and dispersed, followed by eliminating organic solvent and appropriately adding water to prepare pigment covered by water insoluble resin.

A mass ratio of pigment to water insoluble resin can be selected in the range of from 100/40 to 100/150 by the ratio of Pigment/Water insoluble resin. Specifically, 100/60 to 100/110 is preferable, in view of excellent image durability, ejection stability and ink storage. Average particle size of pigment particle covered by water insoluble resin is preferable about 80-150 nm, in view of ink storage stability and coloring property.

(Organic Solvent)

In the present invention, in view of ink ejection stability from inkjet head, maintenance property and glossiness of the formed image, as one of solvents, ink preferably contains water-soluble alkanol amines not less than 0.30% by mass and not more than 3.0% by mass, more preferably not less than 0.3% by mass and not more than 1.8% by mass based on total mass of the ink. Preferably employable water-soluble alkanol amines to the present invention include N,N-dimethylaminoethanol, 2-amino-2-methylpropanol and N-methylaminoethanol.

EXAMPLES

Embodiments of the present invention will now be specifically described with the reference to examples, however the present invention is not limited thereto. Incidentally, the expression of "part" or "%" referred to in Examples represents "part by mass" or "% by mass" unless otherwise specified.

In examples, acid value, glass transition temperature (Tg) and weight average molecular weight are determined by the following methods.

(Measurement of Acid Value)

Into 300 ml of conical flask, 10 g of a resin was weighed and dissolved in 50 ml of ethanol-benzene (1:2) mixture solution. Then, the resulting solution was subjected to titration employing phenol phthalein indicator and a preliminarily standardized 0.01 mol/L potassium hydroxide ethanol solution. From the amount of potassium hydroxide ethanol solution used for titration, acid value in terms of mg KOH/g was determined by the following Calculation formula (1). When the resin could not be dissolved in 50 ml of ethanol-benzene (1:2) mixture solution, titration was carried out in the same manner as above, except for selecting either 50 ml of ethanol or 50 ml of ethanol-pure water (1:1) mixture solution which could dissolve the resin.

$$A=(B \times f \times 5.611)/S, \quad \text{Calculation formula (1):}$$

wherein A represents acid value of resin (mgKOH/g), B represents amount of 0.1 mol/L potassium hydroxide ethanol solution employing for titration (ml), f represents factor of 0.1 mol/L potassium hydroxide ethanol solution, S represents mass of resin (g), and 5.611 represents formula weight of potassium hydroxide.

(Measurement of Glass Transition Temperature (Tg))

The glass transition temperature (Tg) was determined by using, a DSC-7 differential scanning calorimeter and TAC7/DX thermal analysis equipment controller (both produced by Perkin Elmer Corp.).

The measurement is conducted as follows. A resin in an amount of 10.00 mg is precisely weighed to two places of decimals, sealed into an aluminum pan (KIT NO. 0219-0041) and set into a DSC-7 sample holder. An empty aluminum pan is used as a reference.

Temperature is controlled in the range of 0 to 130° C./min through heating-cooling-heating at a temperature-raising rate of 10° C./min and a temperature-lowering rate of 10° C./min. Analysis was carried out based on the data of $2^{nd}$ Heat. Measurement was conducted under nitrogen gas flow.

An extension line from the base-line prior to the initial rise of the first endothermic peak and a tangent line exhibiting the maximum slope between the initial rise and the peak are drawn and the intersection of both lines is defined as the glass transition point Tg.

(Measurement of Weight Average Molecular Weight)

The weight average molecular weight was determined via gel permeation chromatography.

Measurement conditions are as follows
Solvent: tetrahydrofuran
Columns: TSK gel G4000+2500+2000HXL (produced by Tosoh Corporation)
Column temperature: 40° C.
Injection amount: 100
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp., Mw=1,000,000-500) was employed. It is preferable to employ the 13 samples at nearly equal intervals.

Example 1

Synthesis of Copolymer Resin

Synthesis of Copolymer Resin P-1

Into a flask provided with a dropping funnel, a condenser, a nitrogen gas directing tube, a thermometer, and a mechanical stirrer, were loaded 64.8 parts of 2-propanol and heated to reflux, while bubbling a nitrogen gas. Into the dropping funnel, 18.2 parts of methyl methacrylate, 12.6 parts of n-butyl acrylate, 4.2 parts of methacrylic acid and 0.2 parts of initiator (AIBN) were dissolved in mixture, and the mixture was dropped for about 2 hours. Thereafter, resulting solution was heated to reflux for thither 5 hours. After standing to cool the reaction solution, 2-propanol was distilled away under reduced pressure to obtain Copolymer resin P-1.

Synthesis of Copolymer Resins P-2 to P-19

Copolymer resins P-2 to P-19 were synthesized in the same manner as Synthesis of Copolymer resin P-1, according to the monomer composition ratio listed in Table 1. Herein, weight average molecular weights were arranged by changing amount of initiator.

Tg, acid value and Mw of the copolymer resins were listed in Table 1. Monomers described by abbreviation in Table 1 were as follows:
MMA: Methyl methacrylate
EHA: 2-Ethylhexyl acrylate
n-BA: n-Butyl acrylate
i-BA: i-Butyl acrylate
EA: Ethyl acrylate
MAA: Methacrylic acid
AA: Acrylic acid
St: Styrene

TABLE 1

| Copolymer resin | Monomer composition ratio ||||||||| Physical properties |||
| | Acrylic ester |||| | Acidic monomer || Others || | Acid | |
| | MMA | EHA | n-BA | i-BA | EA | MAA | AA | St | BMA | Tg | value | Mw |
|---|---|---|---|---|---|---|---|---|---|---|---|---|
| P-1 | 52 | | 36 | | | 12 | | | | 35 | 78 | 32,000 |
| P-2 | 70 | 22 | | | | 8 | | | | 63 | 52 | 36,000 |
| P-3 | 60 | 25 | | | | 15 | | | | 60 | 98 | 74,000 |
| P-4 | 50 | | | | 33 | 17 | | | | 64 | 111 | 24,000 |
| P-5 | 76 | 14 | | | | 10 | | | | 80 | 65 | 42,000 |
| P-6 | 66 | | | 20 | | 14 | | | | 84 | 91 | 48,000 |
| P-7 | 66 | | 15 | | | 19 | | | | 85 | 124 | 88,000 |
| P-8 | 58 | | | | 20 | 22 | | | | 88 | 143 | 36,000 |
| P-9 | 65 | | | | 25 | | 10 | | | 64 | 78 | 33,000 |
| P-10 | 83 | | | 9 | | | 8 | | | 87 | 62 | 42,000 |
| P-11 | 37 | 48 | | | | 15 | | | | 18 | 98 | 33,000 |
| P-12 | 71 | | | | 8 | 21 | | | | 109 | 137 | 66,000 |
| P-13 | 73 | | 21 | | | 6 | | | | 58 | 39 | 42,000 |
| P-14 | 50 | 18 | | | | 32 | | | | 92 | 208 | 71,000 |
| P-15 | 37 | | | | 44 | 19 | | | | 49 | 124 | 15,000 |
| P-16 | 71 | | 13 | | | 16 | | | | 86 | 104 | 112,000 |

TABLE 1-continued

| Copolymer resin | Monomer composition ratio | | | | | | | | | Physical properties | | |
|---|---|---|---|---|---|---|---|---|---|---|---|---|
| | Acrylic ester | | | | | Acidic monomer | | Others | | | | |
| | MMA | EHA | n-BA | i-BA | EA | MAA | AA | St | BMA | Tg | Acid value | Mw |
| P-17 | 16 | 4 | | | | 37 | | 43 | | 128 | 241 | 56,000 |
| P-18 | | | | | 13 | 16 | | 71 | | 95 | 104 | 12,000 |
| P-19 | | | | | | | 20 | 40 | 40 | 66 | 155 | 12,000 |

(Preparation of Cyan Pigment Dispersion)

Into ion exchanged water of 66 parts, 12 parts of efka 4570 (solid content: 60%, produced by EFKA) and 5 parts of diethyleneglycol monobutyl ether were added and mixed. Into solution, 15 parts of C.I. Pigment Blue 15:3 was added. After pre-mixing, the resulting solution was dispersed by use of a sand grinder filled at a volume ratio of 50% with zirconia beads of 0.5 mm, whereby Cyan pigment dispersion having pigment content of 15% was prepared.

(Preparation of Ink)
Preparation of Ink C-1

Into 30 parts of ion exchanged water, 5 parts of Copolymer resin P-1 was loaded. Thereto, loaded was 1.05 times of chemical equivalent weight of N,N-dimethylaminoethanol based on the chemical equivalent weight of Copolymer resin P-1 and followed by heating at 60° C. and mixing to dissolve. After standing to cool the solution, loaded were diethyleneglycol monobutyl ether, diethyleneglycol monoethyl ether, and 1,3-dimethyl-2-imidazolidinon as organic solvent, so as to arrange ink content listed in Table 2. Further, loaded was 0.5 parts of KF-351A (produced by Shin-Etsu Chemical Co., Ltd.) as silicone type surfactant and mixed. The solution was arranged to be 80 parts in total mass by adding ion exchanged water. Then, loaded was 20 parts of the cyan pigment dispersion thereto and mixed, followed by filtering by 0.8 μm filter, whereby Cyan ink C-1 was prepared.

Preparation of Inks C-2 to C-21

Inks C-2 to C-21 were prepared in the same manner as Ink C-1 by employing species and content of copolymer resin, base for neutralization, organic solvent and surfactant listed in Table 2 and by arranging content of cyan pigment dispersion so as to have mass ratio of Copolymer/Pigment listed in Table 2. When base for neutralization was ammonia, 28% ammonia water was employed. In Table 2, contents of resin in copolymer resin and organic solvent represents content based on ink (% by mass).

Organic solvents, bases for neutralization, and surfactants described by abbreviation in Table 2 were as follows:
(Organic Solvent)
   DEGBE: Diethyleneglycol monobutylether
   DEGEE: Diethyleneglycol monoethyl ether
   DMI: 1,3-Dimethyl-2-imidazolidine
   HDO: 1,2-Hexane diol
(Base for Neutralization)
   DMAE: N,N-Dimethylaminoethanol
   AMP: 2-Amino-2-methylpropanol
(Surfactant)
   Si-1: Silicone type surfactant KF-351A produced by Shin-Etsu Chemical Co., Ltd.
   Si-2: Silicone type surfactant BYK347 produced by BYK-Chemie GmbH.
   F: Fluorine type surfactant FC-430 produced by 3M.

TABLE 2

| Ink | Copolymer resin | | Base for neutralization | Mass ratio of Copolymer resin/Pigment | Contents of Organic solvent | | | | Surfactant |
|---|---|---|---|---|---|---|---|---|---|
| | Species | Content | | | DEGBE | DEGEE | DMI | HDO | |
| C-1 | P-1 | 5% | DMAE | 1.7 times | 5% | 10% | 10% | | Si-1 |
| C-2 | P-2 | 6% | DMAE | 2 times | 10% | 10% | 5% | | Si-1 |
| C-3 | P-2 | 4.5% | Ammonia | 1.5 times | 5% | 10% | 10% | | Si-2 |
| C-4 | P-3 | 8% | DMAE | 13 times | 5% | 10% | 5% | 5% | F |
| C-5 | P-4 | 4.5% | AMP | 1.5 times | 5% | 15% | 10% | | F |
| C-6 | P-5 | 5% | DMAE | 1.7 times | 5% | 10% | 10% | | Si-2 |
| C-7 | P-6 | 6% | AMP | 2 times | | 10% | 10% | 5% | Si-2 |
| C-8 | P-6 | 5% | Ammonia | 1.7 times | 5% | 10% | 10% | | Si-2 |
| C-9 | P-7 | 8% | AMP | 2.7 times | 5% | 10% | 10% | | Si-1 |
| C-10 | P-8 | 2% | DMAE | 0.7 times | 5% | 10% | 10% | | Si-1 |
| C-11 | P-9 | 5% | DMAE | 1.5 times | 5% | 10% | 10% | | F |
| C-12 | P-10 | 3% | AMP | 1 times | 5% | 10% | 10% | | F |
| C-13 | P-11 | 6% | DMAE | 1.7 times | 5% | 10% | 10% | | Si-2 |
| C-14 | P-12 | 5% | AMP | 1.7 times | 5% | 10% | 10% | | Si-2 |
| C-15 | P-13 | 5% | DMAE | 2 times | 5% | 10% | 10% | | F |
| C-16 | P-14 | 5% | Ammonia | 1 times | 5% | 10% | 10% | | F |
| C-17 | P-15 | 8% | DMAE | 3 times | | 10% | 10% | | Si-2 |
| C-18 | P-16 | 5% | AMP | 1.7 times | 5% | 10% | 10% | | Si-2 |
| C-19 | P-17 | 5% | Ammonia | 1.7 times | 5% | 10% | 10% | | Si-2 |
| C-20 | P-18 | 5% | DMAE | 1.7 times | 5% | 10% | 10% | | Si-1 |
| C-21 | P-19 | 5% | DMAE | 1.7 times | 5% | 10% | 10% | | Si-1 |

Each ink prepared above was evaluated according to the following methods. Herein, surface tension of each ink determined by plate method was in the range of 26-30 mN/m.

(Image Formation)

Each ink prepared above was set in one of the inkjet head in an on-demand type inkjet printer which has 4 lines of piezo type heads where a nozzle pore size was 28 μm, a driving frequency was 18 kHz, a nozzle number was 512, an amount of an minimum ink droplet was 14 pl, and a nozzle density was 180 dpi.

The printer can warm a medium from the bottom (the opposite side facing to the head) by a contact type heater at appropriate temperature, being equipped with a position for ink idle print and a maintenance unit in a head housing position, and can perform head cleaning in arbitrary frequency.

Then, onto recording medium of soft vinyl chloride sheet for solvent inkjet printer, images with a printing resolution 720 dpi×720 dpi, and solid image by 10 cm×10 cm size with 100% and 50% Duty were printed to be a recorded image.

During printing onto the polyvinyl chloride recording medium, back side of the recording medium was heated by controlling heater to be at 45° C. at a surface temperature of the recording medium when image was recorded. Herein, the surface temperature of the recording medium was determined by using Non-contact thermometer (IT-530N type produced by Horiba Ltd.). After recording, the printed matter was dried for 24 hours under room temperature (25° C.) and recorded images and printing performances were evaluated as follows.

<<Evaluation of Recorded Image and Printing Performance>>

(Abrasion Resistance)

Each of the resulting solid images was scrubbed by dry cotton (Kanakin No. 3) with load of 300 g. Abrasion resistance was evaluated based on the following criteria.

A: No change was observed in image under friction of 50 times or more.

B: Slight scratch remained but did not affect image density after friction of 50 times.

C: Image density became lowered during friction between 21 and less than 50 times.

D: Image density became lowered under friction of less than 20 times.

Ranks A to C were considered to be practically preferable in above criteria.

(Evaluation of Adhesiveness)

Three cm of adhesive cellophane tape was adhered onto each resulting solid image of 100% Duty. After that, the tape was quickly peeled from the layer, and the surface state of the image was observed.

A: No change was observed at the surface state.

B: Slight trace was remained on the surface.

C: A part of the image was peeled off and the decrease of color density was observed.

D: Most of the image was peeled off and the substrate was observed as white background.

Ranks A to C were considered to be practically preferable in above criteria.

(Evaluation of Glossiness)

For the solid image portion having 100% Duty of the recorded image, 20° specular glossiness was measured. A declination glossmeter VGS-1000 1DP supplied from Nippon Denshoku Industries Co., Ltd. was used for the measurement of 20° specular glossiness.

A: 20° specular glossiness is 100% or more

B: 20° specular glossiness is 80% or more and less than 100%.

C: 20° specular glossiness is 60% or more and less than 80%.

D: 20° specular glossiness is less than 60%.

(Evaluation of Ink Mixing)

In the recorded image, 50% Duty image was observed by visual inspection and by using microscope and evaluated based on the following criteria.

A: No patchy pattern caused by coalescence of droplets was observed by visual inspection and few coalescence of each droplets was observed by using microscope.

B: Patchy pattern caused by coalescence of droplets was observed without particular distinction by visual inspection and slight coalescence of each droplet was observed by using microscope.

C: Some patchy patterns caused by coalescence of droplets were observed partly by visual inspection and much coalescence of droplets was observed by using microscope.

D: Patchy patterns caused by coalescence of droplets were apparently observed by visual inspection and they degraded image quality.

(Evaluation of Ejection Stability)

Under the ambience of 25° C., relative humidity 30%, evaluation images were printed continuously 8 times, and image 100% Duty in $8^{th}$ print was evaluated based on the following criteria.

A: No image defect was noted.

B: Slight blur was observed at the start portion of the image (not more than 2 mm).

C: Slight image defect (lines caused by ink ejection failure) was observed.

D: Much image defects caused by ink ejection failure were observed.

(Maintenance Property)

After evaluation images were printed under ambience of 25° C., relative humidity 30%, nozzle surface was standing for 1 hour without capping. Subsequently, immediately after maintenance of nozzle was carried out, evaluation image was printed under ambience of 25° C., relative humidity 30%, and resulting image was observed and evaluated based on the following criteria.

A: No image defect was observed.

B: Slight image defect (ejection failure) was observed.

C: Partially image defects (ejection failure) were observed.

D: Most part of the image was not printed by defects.

Results were listed in Table 3.

TABLE 3

| | Evaluation results | | | | | | |
|---|---|---|---|---|---|---|---|
| Ink | Durability | Adhesiveness | Glossiness | Ink mixing | Ejection | Maintenance | Remarks |
| C-1 | B | A | B | A | A | A | Inv. |
| C-2 | A | A | A | A | A | B | Inv. |
| C-3 | A | A | B | A | A | C | Inv. |
| C-4 | A | A | B | A | C | C | Inv. |
| C-5 | B | B | B | C | A | A | Inv. |
| C-6 | A | A | A | A | A | A | Inv. |
| C-7 | A | A | B | A | A | A | Inv. |
| C-8 | B | A | B | A | A | C | Inv. |
| C-9 | C | B | C | A | C | B | Inv. |
| C-10 | C | B | C | B | A | A | Inv. |
| C-11 | B | A | B | A | A | A | Inv. |
| C-12 | B | B | B | B | A | A | Inv. |
| C-13 | D | B | C | B | B | A | Comp. |
| C-14 | D | D | C | B | B | B | Comp. |
| C-15 | D | B | C | A | D | C | Comp. |
| C-16 | D | C | D | B | B | C | Comp. |
| C-17 | C | D | C | D | B | B | Comp. |
| C-18 | B | B | C | A | D | D | Comp. |
| C-19 | D | D | D | B | B | C | Comp. |
| C-20 | C | D | C | D | A | B | Comp. |
| C-21 | D | D | C | D | B | B | Comp. |

The results described in Table 3 clearly show that each of the inks of the present invention exhibits excellent performances such as ink ejection and maintenance property, as well as abrasion resistance, adhesiveness, glossiness and ink mixing in case of printing onto polyvinylchloride as recording medium, compared to the comparative inks.

Example 2

Preparation of Pigment Dispersion

Yellow, Magenta, Cyan, Black Pigment dispersion each was prepared in the same manner as Example 1, by using carbon black, C.I. Pigment Red 122, C.I. Pigment Yellow 74 as well as C.I. Pigment Blue 15:3.

Ink sets listed in Table 4 were prepared in the same manner as Example 1, except for employing Pigment dispersions, Copolymer resin prepared in Example 1, base for neutralization, organic solvent, and surfactant as shown in Table 4.

TABLE 4

| Ink set | Ink | Pigment dispersion | Copolymer resin Species | Content | Base for neutralization | Mass ratio of Copolymer resin/Pigment | Content of Organic solvent DEGBE | DEGEE | DMI | Surfactant |
|---|---|---|---|---|---|---|---|---|---|---|
| Ink set 1 | Y-101 | Yellow | P-5 | 5% | DMAE | 1.7 times | 5% | 10% | 5% | Si-2 |
| | M-101 | Magenta | P-5 | 4.5% | DMAE | 1.5 times | 5% | 8% | 4% | Si-2 |
| | C-101 | Cyan | P-5 | 6% | DMAE | 2 times | 5% | 12% | 6% | Si-2 |
| | K-101 | Black | P-5 | 5% | DMAE | 1.7 times | 5% | 10% | 5% | Si-2 |
| Ink set 2 | Y-102 | Yellow | P-17 | 5% | Ammonia | 1.7 times | 5% | 10% | 5% | Si-2 |
| | M-102 | Magenta | P-17 | 4.5% | Ammonia | 1.5 times | 5% | 8% | 4% | Si-2 |
| | C-102 | Cyan | P-17 | 6% | Ammonia | 2 times | 5% | 12% | 6% | Si-2 |
| | K-102 | Black | P-17 | 5% | Ammonia | 1.7 times | 5% | 10% | 5% | Si-2 |

(Image Formation)

These ink set were set in the on-demand type inkjet printer used in Example 1. Then, solid images by 10 cm×10 cm size with 100% Duty and images with 4 color thin lines overlapped in reticular patterns were printed to be a recorded image.

With respect to the resulting evaluation images, abrasion resistance, adhesiveness, and glossiness were evaluated in the same manner as Example 1. Further, color bleeding were evaluated based on the following criteria.

(Evaluation of Color Bleeding)

Color bleeding is a phenomenon in which ink droplets adjacently deposited are mixed and a smear is produced in the boundary area of the image having a different color.

Images with 4 color thin lines overlapped in reticular patterns were observed by visual inspection and by using microscope and evaluated based on the following criteria.

A: No color bleeding was observed between all colors.

B: Slight color bleeding was detected between specific 2 colors by microscope observation; however it has little influence on image quality by visual inspection.

C: Slight color bleeding was detected by visual inspection, however little degradation of image quality was noted.

D: Much color bleeding occurred and degradation of image quality was noted

Results were listed in Table 5.

TABLE 5

| | Ink set | Evaluation results Abrasion resistance | Adhesiveness | Glossiness | Color bleed | Remarks |
|---|---|---|---|---|---|---|
| Ink set 1 | Y-101 | A | A | A | A | Inv. |
| | M-101 | B | A | A | | |
| | C-101 | A | A | A | | |
| | K-101 | A | A | A | | |
| Ink | Y-102 | D | D | B | D | Comp. |
| set 2 | M-102 | D | D | C | | |
| | C-102 | D | D | B | | |
| | K-102 | D | D | B | | |

The results described in Table 5 clearly show that each of the inks of the present invention exhibits excellent performances such as abrasion resistance, adhesiveness, glossiness and color bleeding in case of printing onto polyvinylchloride as recording medium, compared to the comparative inks.

Example 3

By using the same ink set used in Example 2, printing was performed under the same conditions as Example 2. Then, instead of drying after printing for 24 hours at room temperature, printed images were prepared by drying for 5 minutes at the temperature described in Table 6 immediately after printing and further drying for 6 hours at room temperature.

After printing, back side of t the recorded image was heat-dried by controlling heater to be the temperature described in Table 6 at a surface temperature of the recording medium. Herein, the surface temperature of the recording medium was determined by using Non-contact thermometer.

Resulting recorded image were evaluated as follows:

(Abrasion Resistance 2)

Each of the resulting solid images of 100% Duty was scrubbed by dry cotton (Kanakin No. 3) with load of 700 g. Abrasion resistance was evaluated based on the following criteria.

A: No change was observed in image during frictions of 50 times or more.

B: Slight scratch remained but did not affect image density after frictions of 50 times.

C: Image density became lowered during frictions between 21 and less than 50 times.

D: Image density became lowered during frictions of less than 20 times.

Ranks A to C were considered to be practically preferable in above criteria.

(Adhesiveness 2)

Three cm of adhesive cellophane tape was adhered onto each resulting solid image of 100% Duty. After that, the tape was quickly peeled from the layer repeatedly 5 times at the same position, and the surface state of the image was observed.

A: No change was observed at the surface state.

B: Slight trace was remained on the surface.

C: A part of the image was peeled off and the decrease of color density was observed.

D: Most of the image was peeled off and the substrate was observed as white background.

Ranks A to C were considered to be practically preferable in above criteria.

Results were listed in Table 6.

TABLE 6

| Ink set | | Drying temp. after printing | Evaluation results | | Remarks |
|---|---|---|---|---|---|
| | | | Abrasion resistance | Adhesiveness | |
| Ink set 1 | Y-101 | Room temp. (25° C.) | B | B | Inv. |
| | M-101 | | C | C | |
| | C-101 | | C | B | |
| | K-101 | | C | B | |
| | Y-101 | 60° C. | A | A | |
| | M-101 | | B | B | |
| | C-101 | | B | A | |
| | K-101 | | B | B | |
| | Y-101 | 80° C. | A | A | |
| | M-101 | | A | A | |
| | C-101 | | A | A | |
| | K-101 | | A | A | |
| Ink set 2 | Y-102 | Room temp. (25° C.) | D | D | Comp. |
| | M-102 | | D | D | |
| | C-102 | | D | D | |
| | K-102 | | D | D | |
| | Y-102 | 60° C. | D | D | |
| | M-102 | | D | D | |
| | C-102 | | D | D | |
| | K-102 | | D | D | |
| | Y-102 | 80° C. | D | D | |
| | M-102 | | D | D | |
| | C-102 | | D | D | |
| | K-102 | | D | D | |

The results described in Table 6 clearly show that each of the inks of the present invention exhibits excellent abrasion resistance and adhesiveness in case of printing onto polyvinylchloride as recording medium, compared to the comparative inks. Further, performance was more improved in case of heat-drying than drying only at room temperature.

Example 4

Synthesis of Copolymer Resin

[Synthesis of Copolymer Resin 1: Ammonium Salt]

Into 500 ml of four-neck flask provided with a mechanical stirrer, a nitrogen gas directing tube, a condenser, and a dropping funnel, were loaded 185 g of isopropyl alcohol, and heated to reflux, while bubbling a nitrogen gas. Into the dropping funnel, 46 g of methyl methacrylate, 39 g of n-butyl methacrylate, 15 g of methacrylic acid and 0.5 g of azobisisobutyronitrile (AIBN) as an initiator were dissolved in mixture, and the mixture was dropped for about 2 hours in a state of heated to reflux. After finishing dropping, further heated to reflux for 6 hours, and isopropyl alcohol solution containing 0.05 g of AIBN was dropped for 15 minutes. Thereafter, resulting solution was heated to reflux for further 5 hours.

After standing to cool the reaction solution, isopropyl alcohol was distilled away under reduced pressure. Into the resulting residue, 12.4 g of 28% ammonia water as a base for alkali neutralization and 553 g of ion exchanged water were added and followed by heating and mixing to dissolve. Solid content of resin in this Copolymer resin 1 solution (ammonia salt) was about 15% by mass.

Acid value, glass transition temperature and weight average molecular weight of prepared Copolymer resin 1 were determined based on the methods described above.

Acid value of Copolymer resin 1 was 102 mgKOH/g.

Glass transition temperature of Copolymer resin 1 was 79° C.

Weight average molecular weight of Copolymer resin 1 was 46,000.

[Preparation of Copolymer Resin 1A]

Copolymer resin 1A being dimethylaminoethanol salt was prepared in the same manner as preparation of Copolymer resin 1 described above, except for using 18.2 g of N,N-dimethylaminoethanol instead of 12.4 g of 28% ammonia water.

Acid value, glass transition temperature and weight average molecular weight of Copolymer resin 1A were determined based on the methods described above. Results were listed in Table 7.

[Preparation of Copolymer Resins 2 to 16]

Copolymer resins 2 to 16 were prepared in the same manner as preparation of Copolymer resin 1 described above, except for changing monomer composition as listed in Table 1. Herein, polymerization conditions were appropriately arranged so as to obtain weight average molecular weight listed in Table 1.

Acid value, glass transition temperature and weight average molecular weight of Copolymer resins 2 to 16 were determined based on the methods described above. Results were listed in Table 7.

TABLE 7

| Resin No. | A Acid monomer | | B Methyl meth- acrylate | C Methacrylic alkyl ester | | Other monomers | | Base for alkali Neutraliza- tion | *1 (%) | Acid value *2 | Tg (° C.) | Weight average molecular weight |
|---|---|---|---|---|---|---|---|---|---|---|---|---|
| | Meth- acrylic acid | Acrylic acid | | Species | Content | Species | Content | | | | | |
| 1 | 15 | — | 46 | nBMA | 39 | — | — | A | 100 | 102 | 79 | 46,000 |
| 1A | 15 | — | 46 | nBMA | 39 | — | — | B | 100 | 102 | 79 | 46,000 |
| 2 | 23 | — | 32 | nBMA | 45 | — | — | A | 100 | 152 | 79 | 52,000 |
| 3 | 17 | — | 24 | nBMA | 28 | 2EHMA | 31 | A | 100 | 110 | 48 | 48,000 |
| 4 | 15 | — | 27 | nBMA | 38 | EMA | 20 | A | 100 | 99 | 72 | 45,000 |
| 5 | 14 | — | 21 | nBMA | 41 | tBMA | 24 | A | 100 | 93 | 78 | 46,000 |
| 6 | 15 | — | 26 | nBMA | 49 | HEMA | 11 | A | 100 | 96 | 64 | 56,000 |
| 7 | 10 | — | 44 | nBMA | 46 | — | — | A | 100 | 64 | 68 | 39,000 |
| 8 | 14 | — | 44 | nBMA | 27 | — | EMA | 15 | A | 85 | 88 | 55 | 40,000 |
| 9 | 16 | — | 25 | nBMA | 38 | — | St | 21 | A | 79 | 101 | 78 | 40,000 |
| 10 | 11 | — | 14 | 2EHMA | 75 | — | — | A | 100 | 73 | 18 | 41,000 |
| 11 | 17 | — | 67 | nBMA | 17 | — | — | A | 100 | 109 | 102 | 45,000 |
| 12 | 8 | — | 49 | nBMA | 44 | — | — | A | 100 | 49 | 68 | 42,000 |
| 13 | 31 | — | 18 | nBMA | 51 | — | — | A | 100 | 201 | 80 | 46,000 |

TABLE 7-continued

| Resin No. | A Acid monomer Methacrylic acid | A Acid monomer Acrylic acid | B Methyl methacrylate | C Methacrylic alkyl ester Species | C Methacrylic alkyl ester Content | Other monomers Species | Other monomers Content | Base for alkali Neutralization | *1 (%) | Acid value *2 | Tg (°C.) | Weight average molecular weight |
|---|---|---|---|---|---|---|---|---|---|---|---|---|
| 14 | 17 | — | 24 | nBMA | 28 | 2EHMA | 31 | A | 100 | 110 | 48 | 14,000 |
| 15 | 16 | — | 46 | nBMA | 39 | — | — | A | 100 | 102 | 79 | 120,000 |
| 16 | — | 13 | 59 | nBMA | 28 | — | — | A | 100 | 103 | 77 | 48,000 |

Values in Content represent % by mass.
*1: (A + B + C)/All monomers (%)
*2: mgKOH/g Each of monomers and bases for alkali neutralization described by abbreviation in Table 7 were as follows:
<Monomer>
nBMA: n-butyl methacrylate,
2EHMA: 2-ethylhexyl methacrylate,
tBMA: t-butylmethacrylate,
EMA: ethylmethacrylate,
HEMA: 2-hydroxyethylmethacrylate,
St: styrene,
2EHA: 2-ethylhexylacrylate.
<Base for Alkali Neutralization>
A: ammonia salt,
B: dimethylaminoethanol salt.
<<Preparation of Pigment Dispersion>>
[Black Pigment Dispersion Bk]

| Carbon black | 10.0 parts |
|---|---|
| Pigment dispersant(efka4570: polymer dispersant4570 produced by EFKA) | 5.0 parts |
| Diethyleneglycol monobutyl ether | 5.0 parts |
| Ion exchanged water | 80.0 parts |

After mixing above additives, the foresaid solution was shaken for 6 hours by using a paint conditioner filled at a volume ratio of 50% with zirconia beads of 0.5 mm, followed by eliminating beads, whereby Black pigment dispersion Bk was prepared.

[Preparation of Yellow Pigment Dispersion Y, Magenta Pigment Dispersion M, and Cyan Pigment Dispersion C]
Yellow pigment dispersion Y, Magenta pigment dispersion M, and Cyan pigment dispersion C were prepared by the same manner as the preparation of above Black pigment dispersion Bk, except for changing to C.I. Pigment Yellow 74, C.I. Pigment Red 122 and C.I. Pigment Blue 15:3.
<<Preparation of Ink>>
[Preparation of Ink 1]

| Pigment dispersion: Black pigment dispersion Bk as pigment content | 2.0 parts |
|---|---|
| Copolymer resin: Copolymer resin 1 | 3.5 parts |
| Solvent 1: Diethyleneglycol monobutyl ether (DEGBE) | 5.0 parts |
| Solvent 2: Diethyleneglycol monoethyl ether (DEGEE) | 15.0 parts |
| Solvent 3: 1,3-Dimethyl-2-imidazolidinone (DMID) | 8.0 parts |
| Surfactant: KF-351A | 0.8 parts |

(silicone type surfactant produced by Shin-Etsu Chemical Co., Ltd.)
Ion exchanged water was added balancing to 100 parts.
After adding and mixing above additives, the resulting solution was filtered by 5 μm filter, to prepare Ink 1.
[Preparation of Inks 2 to 18]
Inks 2 to 18 were prepared by the same manner as the preparation of Ink 1, except for changing species of copolymer resin to each resin listed in Table 8.

TABLE 8

| Ink No | Pigment dispersion No. | Pigment content | Resin Species | Resin Content | Solvent 1 Species | Solvent 1 Content | Solvent 2 Species | Solvent 2 Content | Solvent 3 Species | Solvent 3 Content | Surfactant Species | Surfactant Content | Remarks |
|---|---|---|---|---|---|---|---|---|---|---|---|---|---|
| 1 | Bk | 2.0 | 1 | 3.5 | DEGBE | 5.0 | DEGEE | 15.0 | DMID | 8.0 | KF351A | 0.8 | Inv. |
| 2 | Bk | 2.0 | 2 | 3.5 | DEGBE | 5.0 | DEGEE | 15.0 | DMID | 8.0 | KF351A | 0.8 | Inv. |
| 3 | Bk | 2.0 | 3 | 3.5 | DEGBE | 5.0 | DEGEE | 15.0 | DMID | 8.0 | KF351A | 0.8 | Inv. |
| 4 | Bk | 2.0 | 4 | 3.5 | DEGBE | 5.0 | DEGEE | 15.0 | DMID | 8.0 | KF351A | 0.8 | Inv. |
| 5 | Bk | 2.0 | 5 | 3.5 | DEGBE | 5.0 | DEGEE | 15.0 | DMID | 8.0 | KF351A | 0.8 | Inv. |
| 6 | Bk | 2.0 | 6 | 3.5 | DEGBE | 5.0 | DEGEE | 15.0 | DMID | 8.0 | KF351A | 0.8 | Inv. |
| 7 | Bk | 2.0 | 7 | 3.5 | DEGBE | 5.0 | DEGEE | 15.0 | DMID | 8.0 | KF351A | 0.8 | Inv. |
| 8 | Bk | 2.0 | 8 | 3.5 | DEGBE | 5.0 | DEGEE | 15.0 | DMID | 8.0 | KF351A | 0.8 | Inv. |
| 9 | Bk | 2.0 | 1A | 3.5 | DEGBE | 5.0 | DEGEE | 15.0 | DMID | 8.0 | KF351A | 0.8 | Inv. |
| 10 | Bk | 2.0 | 9 | 3.5 | DEGBE | 5.0 | DEGEE | 15.0 | DMID | 8.0 | KF351A | 0.8 | Comp. |
| 11 | Bk | 2.0 | 10 | 3.5 | DEGBE | 5.0 | DEGEE | 15.0 | DMID | 8.0 | KF351A | 0.8 | Comp. |
| 12 | Bk | 2.0 | 11 | 3.5 | DEGBE | 5.0 | DEGEE | 15.0 | DMID | 8.0 | KF351A | 0.8 | Comp. |
| 13 | Bk | 2.0 | 12 | 3.5 | DEGBE | 5.0 | DEGEE | 15.0 | DMID | 8.0 | KF351A | 0.8 | Comp. |
| 14 | Bk | 2.0 | 13 | 3.5 | DEGBE | 5.0 | DEGEE | 15.0 | DMID | 8.0 | KF351A | 0.8 | Comp. |
| 15 | Bk | 2.0 | 14 | 3.5 | DEGBE | 5.0 | DEGEE | 15.0 | DMID | 8.0 | KF351A | 0.8 | Comp. |
| 16 | Bk | 2.0 | 15 | 3.5 | DEGBE | 5.0 | DEGEE | 15.0 | DMID | 8.0 | KF351A | 0.8 | Comp. |
| 17 | Bk | 2.0 | 1 | 3.5 | DEGBE | 5.0 | DEGEE | 15.0 | DMID | 8.0 | FC-430 | 0.8 | Inv. |
| 18 | Bk | 2.0 | 16 | 3.5 | DEGBE | 5.0 | DEGEE | 15.0 | DMID | 8.0 | KF351A | 0.8 | Inv. |

Each additive described by abbreviation in Table 8 was as follows:

<Pigment Dispersion>
Bk: Black pigment dispersion
<Solvent>
DEGBE: Diethyleneglycol monobutylether
DEGEE: Diethyleneglycol monoethylether
DMID: 1,3-Dimethyl-2-imidazolidinone
<Surfactant>
KF-351A: silicone type surfactant KF351A produced by Shin-Etsu Chemical Co., Ltd.
FC-430: fluorine type surfactant, FC-430 produced by 3M.

<<Evaluation of Ink>>

Each ink prepared above was evaluated according to the following methods.

[Image Formation]

Evaluation was carried out by using an on-demand type inkjet printer which has 4 lines of piezo type inkjet heads with solution of 720 dpi (herein, dpi refers to as number of dots in 2.54 cm) and an amount of an minimum ink droplet beings 14 pl. The inkjet printer can warm a medium from the bottom by a contact type heater, being equipped with a position for ink idle print and a maintenance unit in a head housing position, and can perform head cleaning in arbitrary frequency.

Each ink listed in Table 2 was set in the inkjet head for K ink in above inkjet printer. Then, onto recording medium of soft vinyl chloride sheet for solvent inkjet printer, solid image by 10 cm×50 cm size with 10% to 100% Duty in 10% Duty step were printed by K ink to be a recorded image. During printing onto the polyvinyl chloride recording medium, back side of the recording medium was heated by controlling heater to be at 43° C. at a surface temperature of the recording medium when image was recorded. After recording, the printed matter was dried for 24 hours under room temperature (25° C.) and the recorded images and printing performances were evaluated as follows.

[Condition for Each Evaluation]

Consequently, following evaluations were carried out.

(Evaluation of Ejection Stability)

Under the ambience of 20° C., relative humidity 30%, evaluation images were printed continuously 5 times, and image 100% Duty in $5^{th}$ print was evaluated based on the following criteria.

3: No image defect was noted.
2: Slight blur was observed at the start portion of the image (several mm).
1: Much, image defects caused by ink ejection failure were observed.

(Evaluation of Maintenance Property)

After evaluation images were printed under ambience of 20° C., relative humidity 30%, then, nozzle surface was standing for 1 hour without capping. Subsequently, immediately after maintenance of nozzle was carried out by employing blade type maintenance unit, solid image was once printed under ambience of 20° C., relative humidity 30%, and resulting image was observed by visual inspection and maintenance property was evaluated based on the following criteria.

3: In resulting image, no image defect was observed.
2: In resulting image, slight image defect caused by maintenance failure was observed.
1: In resulting image, much image defects by maintenance failure were observed.

(Evaluation of Ink Mixing Resistance)

Above image was once printed under ambience of 30° C., relative humidity 60%. In the recorded image, 10% to 100% Duty images in 10% Duty step were observed by visual inspection and by using microscope in view of coalescence of droplets (ink mixing) and Ink mixing resistance was evaluated based on the following criteria.

3: No patchy pattern caused by coalescence of droplets was observed by visual inspection and few coalescence of each droplets was observed by using microscope.
2: Slight patchy patterns caused by coalescence of droplets were observed by visual inspection and slight coalescence of droplets was observed by using microscope.
1: Patchy patterns caused by coalescence of droplets were apparently observed by visual inspection and they degraded image quality.

(Evaluation of Glossiness)

For the solid image portion having 100% Duty of the recorded image, 20° specular glossiness was measured. A declination glossmeter VGS-10001DP supplied from Nippon Denshoku Industries Co., Ltd. was used for the measurement of 20° specular glossiness.

Glossiness was evaluated based on the following criteria from the resulting 20° specular glossiness.

5: 20° specular glossiness is 100% or more
4: 20° specular glossiness is 85% or more and less than 100%
3: 20° specular glossiness is 55% or more and less than 85%
2: 20° specular glossiness is 30% or more and less than 55%
1: 20° specular glossiness is less than 30%.

(Abrasion Resistance)

Each of the resulting solid images was scrubbed with load of 9N by dry cotton (Kanakin No. 3) and state of scratch on image surface and peel of layer were visually observed and abrasion resistance was evaluated based on the following criteria.

5: No scratch was observed on the image after 30 times of reciprocating friction.
4: No scratch was observed on image after 10 times of reciprocating friction, however slight scratch was observed on the surface after 30 times of reciprocating friction.
3: Scratch was observed on the surface after 10 times of reciprocating friction, and image layer was peeled off after 30 times of reciprocating friction.
2: Image layer was peeled off after 10 times of reciprocating friction.
1: Image layer was peeled off after 5 times of reciprocating friction.

(Adhesiveness)

Cross-cut adhesiveness test was performed on the image prepared by the above method. Cross-cut adhesiveness test was based on a method defined in JIS K 5600 (General test method for Paint), the $5^{th}$ part (Mechanical performance of coating layer), the $6^{th}$ section (Adhesiveness: Cross-cut method). Eleven cutting lines orthogonal oriented each other at 1 mm intervals were provided onto the resulting image. After adhesive tape of cellophane (LP-24 produced by Nichiban) was pressed to adhere onto cross-cut image, the tape was quickly peeled from the layer, and the state of peel off was determined by visual inspection to evaluate adhesiveness based on the following criteria.

4: No peeling off was observed on image layer.
3: Slight peeling off was observed on image layer.
2: A part of image layer was apparently peeled off.
1: Most of image layer was peeled off.

Results were listed in Table 9.

TABLE 9

| Ink No. | Ejection stability | Maintenance property | Ink mixing resistance | Glossiness | Durability | Adhesiveness | Remarks |
|---|---|---|---|---|---|---|---|
| 1 | 3 | 3 | 3 | 5 | 5 | 4 | Inv. |
| 2 | 3 | 3 | 3 | 5 | 5 | 4 | Inv. |
| 3 | 3 | 3 | 3 | 5 | 4 | 4 | Inv. |
| 4 | 3 | 3 | 3 | 5 | 5 | 4 | Inv. |
| 5 | 3 | 3 | 3 | 5 | 5 | 4 | Inv. |
| 6 | 3 | 3 | 3 | 5 | 5 | 4 | Inv. |
| 7 | 3 | 3 | 3 | 5 | 5 | 4 | Inv. |
| 8 | 3 | 3 | 3 | 5 | 5 | 4 | Inv. |
| 9 | 3 | 3 | 3 | 4 | 4 | 4 | Inv. |
| 10 | 3 | 3 | 3 | 3 | 2 | 1 | Comp. |
| 11 | 3 | 3 | 3 | 2 | 1 | 2 | Comp. |
| 12 | 3 | 2 | 3 | 3 | 1 | 2 | Comp. |
| 13 | 2 | 2 | 2 | 2 | 3 | 2 | Comp. |
| 14 | 3 | 3 | 2 | 3 | 2 | 2 | Comp. |
| 15 | 3 | 3 | 2 | 3 | 2 | 2 | Comp. |
| 16 | 1 | 1 | 3 | 2 | 3 | 3 | Comp. |
| 17 | 3 | 3 | 3 | 5 | 5 | 4 | Inv. |
| 18 | 3 | 3 | 3 | 5 | 5 | 4 | Inv. |

The results described in Table 9 clearly show that each of the inks of the present invention exhibits excellent ejection stability and maintenance property; and also formed image has excellent ink mixing resistance, glossiness, and adhesiveness to substrate (polyvinylchloride sheet), compared to the comparative inks.

Example 5

Preparation of Ink

[Preparation of Inks 19 to 27]

Inks 19 to 27 were prepared by the same manner as the preparation of Ink 1 described in Example 4, except for changing species and content of copolymer resin, solvent compositions, species and content of surfactant as well as species and content of alkanol amines as listed in Table 10.

TABLE 10

| Ink No. | Pigment dispersion No. | Pigment content | Resin No. | Resin Content | Solvent 1 Species | Solvent 1 Content | Solvent 2 Species | Solvent 2 Content | Solvent 3 Species | Solvent 3 Content | Solvent 4 Species | Solvent 4 Content | Surfactant Species | Surfactant Content | Alkanol amine Species | Alkanol amine Content | Remarks |
|---|---|---|---|---|---|---|---|---|---|---|---|---|---|---|---|---|---|
| 19 | Bk | 3.0 | 1 | 6.0 | DEGBE | 5.0 | DEGEE | 15.0 | DMID | 8.0 | — | — | BYK347 | 0.8 | — | — | Inv. |
| 20 | Bk | 3.0 | 1 | 6.0 | DEGBE | 5.0 | DEGEE | 15.0 | DMID | 8.0 | — | — | BYK347 | 0.8 | DMAE | 1.6 | Inv. |
| 21 | Bk | 3.0 | 1 | 6.0 | DEGBE | 5.0 | DEGEE | 15.0 | DMID | 8.0 | — | — | BYK347 | 0.8 | AMP | 1.6 | Inv. |
| 22 | Bk | 3.0 | 1 | 6.0 | DEGBE | 5.0 | DEGEE | 15.0 | DMID | 8.0 | — | — | BYK347 | 0.8 | MAE | 1.6 | Inv. |
| 23 | Bk | 3.0 | 1 | 6.0 | DEGBE | 5.0 | DEGEE | 15.0 | DMID | 8.0 | — | — | BYK348 | 1.0 | DMAE | 1.6 | Inv. |
| 24 | Bk | 3.0 | 1 | 6.0 | DEGEE | 10.0 | DPGM | 5.0 | HD | 6.0 | Pyd | 10.0 | *3 | *3 | DMAE | 1.6 | Inv. |
| 25 | Bk | 3.0 | 1 | 6.0 | DEGEE | 15.0 | HD | 5.0 | SF | 5.0 | — | — | BYK347 | 0.8 | DMAE | 1.6 | Inv. |
| 26 | Bk | 3.0 | 1 | 6.0 | DEGEE | 15.0 | HD | 5.0 | BL | 2.0 | — | — | BYK347 | 0.5 | DMAE | 1.6 | Inv. |
| 27 | Bk | 3.0 | 15 | 6.0 | DEGBE | 5.0 | DEGEE | 15.0 | DMID | 8.0 | — | — | BYK347 | 0.8 | DMAE | 1.6 | Comp. |

*3: BYK347 + E1010 = 0.4 + 1.0

Each of additives described by abbreviation in Table 10 except for ones already shown in Example 1 was detailed as follows:

<Solvent>
DPGM: Dipropyleneglycol monomethyl
HD: 1,2-Hexanediol
SP: Sulphorane
Pyd: 2-pyrolidone
BL: Butyl lactate <Surfactant>
BYK347: Silicone type surfactant, BYK-347 produced by BYK Chemie Japan
BYK348: Silicone type surfactant, BYK-348 produced by BYK Chemie Japan
E1010: Nonionic surfactant, Olfine E1010 produced by Nissin Chemical Industry Co., Ltd <<Evaluation of Ink>>

Images were formed by using each ink prepared above and evaluated according to the following methods.

[Image Formation]

Inks listed in Table 11 were set in the inkjet head for K ink in the inkjet printer described in Example 4. Then, onto recording medium of soft vinyl chloride sheet for solvent inkjet printer, solid image by 50 cm×50 cm size with 100% Duty and images with thin lines in grid patterns were printed by each ink to be a recorded image. Back side of the recording medium was heated by controlling heater to be at 47° C. at a surface temperature of the recording medium when image was recorded.

[Condition for Each Evaluation]

Consequently, ejection stability 2 and drying performance of formed image for each ink were evaluated based on the following method. Further, evaluation of abrasion resistance was performed in the same manner as Example 4. As for evaluation other than drying performance, the printed matter was dried for 24 hours under room temperature (25° C.) after recording.

(Evaluation of Ejection Stability 2)

Under the above printing conditions, evaluation images were printed continuously 10 times, and 100% Duty image and image of thin lines of the last print was observed by visual inspection and Ejection stability 2 was evaluated based on the following criteria.

3: No image defect was noted in solid image and dots were clearly reproduced at thin line. Also no distorted image was noted.

2: No image defect was noted in solid image, however slight distorted image was observed in thin line. Also slight mist was observed.

1: Image defects were observed partially in the solid image and distortion was apparently observed in thin line.

(Evaluation of Drying Performance)

Image immediately after printing was dried by employing warm air dryer of 60° C. After drying, cotton cloth was contacted on the image and a time until ink did not contaminate cotton was determined and was employed as criteria of drying performance. The smaller the number refers more excellent drying performance.

Results were listed in Table 11.

TABLE 11

| Ink No. | Ejection stability 2 | Abrasion resistance | Drying time (min) | Remarks |
|---|---|---|---|---|
| 19 | 2 | 4 | 3 | Inv. |
| 20 | 3 | 5 | 3 | Inv. |
| 21 | 3 | 5 | 3 | Inv. |
| 22 | 3 | 5 | 3 | Inv. |
| 23 | 3 | 5 | 3 | Inv. |
| 24 | 3 | 5 | 3 | Inv. |
| 25 | 3 | 5 | 3 | Inv. |
| 26 | 3 | 5 | 3 | Inv. |
| 27 | 1 | 3 | 5 | Comp. |

The results described in Table 11 clearly show that the inks of the present invention enhances ejection stability 2 and abrasion resistance without affecting on drying performance by employing alkanol amines in combination.

Example 6

Preparation of Ink Set

[Preparation of Inks 28 to 35]

Inks 28 to 35 were prepared by the same manner as the preparation of Ink 1 described in Example 4, except for changing species of pigment dispersion and content of pigment, species and content of copolymer resin as listed in Table 12.

Each of additives described by abbreviation in Table 12 was detailed as follows:

Y: Yellow pigment dispersion Y
M: Magenta pigment dispersion M
C: Cyan pigment dispersion C
Bk: Black pigment dispersion Bk

[Ink Set 1]

Inks 28(Y), 29(M), 30C and 31(Bk) prepared above were combined to be Ink set 1.

[Ink Set 2]

Inks 32(Y), 33(M), 34C and 35(Bk) prepared above were combined to be Ink set 2.

<<Evaluation of Ink>>

Images were formed by using each ink prepared above and evaluated according to the following methods.

[Image Formation]

Each ink was set in the inkjet heads for Y ink, M ink, C ink and Bk ink respectively in the inkjet printer described in Example 4. Then, onto recording medium, high-definition color digital standard image by 10 cm×10 cm size was printed in the same manner as the method described in Example 4.

[Condition for Each Evaluation]

Consequently, ink mixing resistance 2 was evaluated based on the following method. Further, evaluations of glossiness and abrasion resistance were performed in the same manner as Example 4.

(Evaluation of Ink Mixing Resistance 2)

In the high-definition color digital standard image, color bleeding between each color or patchy pattern caused by beading at the secondary color which has much ink amount was observed by visual inspection. Ink mixing resistance 2 was evaluated based on the following criteria.

3: No color bleeding and no patchy pattern was observed. High quality print was achieved.

2: Color bleeding and patchy pattern was partially observed.

1: Much color bleeding and patchy pattern occurred.

Results were listed in Table 13.

TABLE 13

| | Ink set No. | | | | | | | |
|---|---|---|---|---|---|---|---|---|
| | Ink set 1 | | | | Ink set 2 | | | |
| Ink No. | 28 | 29 | 30 | 31 | 32 | 33 | 34 | 35 |
| Ink mixing 2 | 3 | | | | 2 | | | |
| Glossiness | 5 | 5 | 5 | 5 | 4 | 3 | 4 | 3 |
| Abrasion resistance | 5 | 5 | 5 | 5 | 4 | 2 | 3 | 2 |
| Remarks | Inventive example | | | | Comparative example | | | |

TABLE 12

| | Pigment dispersion | | Resin | | Solvent 1 | | Solvent 2 | | Solvent 3 | | Surfactant | | |
|---|---|---|---|---|---|---|---|---|---|---|---|---|---|
| Ink No | No. | Pigment content | Species | Content | Species | Content | Species | Content | Species | Content | Species | Content | Remarks |
| 28 | Y | 2.5 | 1 | 5.0 | DEGBE | 5.0 | DEGEE | 15.0 | DMID | 8.0 | KF351A | 0.8 | Inv. |
| 29 | M | 3.0 | 1 | 6.0 | DEGBE | 5.0 | DEGEE | 15.0 | DMID | 8.0 | KF351A | 0.8 | Inv. |
| 30 | C | 3.0 | 1 | 5.0 | DEGBE | 5.0 | DEGEE | 15.0 | DMID | 8.0 | KF351A | 0.8 | Inv. |
| 31 | Bk | 3.0 | 1 | 6.0 | DEGBE | 5.0 | DEGEE | 15.0 | DMID | 8.0 | KF351A | 0.8 | Inv. |
| 32 | Y | 2.5 | 14 | 5.0 | DEGBE | 5.0 | DEGEE | 15.0 | DMID | 8.0 | KF351A | 0.8 | Comp. |
| 33 | M | 3.0 | 14 | 6.0 | DEGBE | 5.0 | DEGEE | 15.0 | DMID | 8.0 | KF351A | 0.8 | Comp. |
| 34 | C | 3.0 | 14 | 5.0 | DEGBE | 5.0 | DEGEE | 15.0 | DMID | 8.0 | KF351A | 0.8 | Comp. |
| 35 | Bk | 3.0 | 14 | 6.0 | DEGBE | 5.0 | DEGEE | 15.0 | DMID | 8.0 | KF351A | 0.8 | Comp. |

The results described in Table 13 clearly show that the inks of the present invention exhibits excellent ink mixing resistance, glossiness and abrasion resistance, compared to the comparative inks.

Example 7

By employing ink set in Example 6, in the same manner as Example 6, printing was performed. Instead of drying after printing for 24 hours at room temperature (25° C.), printed image was formed by drying for 3 minutes at the temperature listed in Tables 14 and 15 immediately after printing, followed by further drying for 6 hours at room temperature. Herein, image after printing was dried by employing warm air dryer.

Resulting recorded image were evaluated as follows:

(Abrasion Resistance 2)

Each of the resulting solid images of 100% Duty was scrubbed by dry cotton (Kanakin No. 3) with load of 18N. Scratch on the surface of image and peeling off of layer was visually observed and abrasion resistance was evaluated based on the following criteria.

5: No scratch was observed on the image after 30 times of reciprocating friction.

4: No scratch was observed on image after 10 times of reciprocating friction, however slight scratch was observed on the surface after 30 times of reciprocating friction.

3: Scratch was observed on the surface after 10 times of reciprocating friction, and image layer was peeled off after 30 times of reciprocating friction.

2: Image layer was peeled off after 10 times of reciprocating friction.

1: Image layer was peeled off after 5 times of reciprocating friction.

Ranks 3 to 5 were considered to be practically preferable in above criteria.

(Adhesiveness 2)

Three cm of adhesive cellophane tape was adhered onto each resulting solid image of 100% Duty. After that, the tape was quickly peeled from the layer repeatedly 5 times at the same position, and the surface state of the image was evaluated.

4: No change was observed at the surface state.

3: Slight trace was remained on the surface.

2: A part of the image was peeled off and the decrease of color density was observed.

1: Most of the image was peeled off and the substrate was observed as white background.

Ranks 3 to 4 were considered to be practically preferable in above criteria.

Results were listed in Tables 14 and 15.

TABLE 14

| | Ink set No. Ink set 1 | | | | | | | | | | | |
|---|---|---|---|---|---|---|---|---|---|---|---|---|
| Ink No. | 28 | 29 | 30 | 31 | 28 | 29 | 30 | 31 | 28 | 29 | 30 | 31 |
| Drying temperature | Room temp.(25° C.) | | | | 60° C. | | | | 80° C. | | | |
| Abrasion resistance 2 | 4 | 3 | 3 | 3 | 5 | 4 | 4 | 4 | 5 | 5 | 5 | 5 |
| Adhesiveness 2 | 3 | 3 | 3 | 3 | 4 | 3 | 4 | 4 | 4 | 4 | 4 | 4 |
| Remarks | | | | | Inv. | | | | | | | |

TABLE 15

| | Ink set No. Ink set 2 | | | | | | | | | | | |
|---|---|---|---|---|---|---|---|---|---|---|---|---|
| Ink No. | 32 | 33 | 34 | 35 | 32 | 33 | 34 | 35 | 32 | 33 | 34 | 35 |
| Drying temperature | Room temp.(25° C.) | | | | 60° C. | | | | 80° C. | | | |
| Abrasion resistance 2 | 2 | 1 | 2 | 1 | 2 | 1 | 2 | 2 | 3 | 2 | 2 | 2 |
| Adhesiveness 2 | 2 | 1 | 1 | 1 | 2 | 1 | 2 | 1 | 2 | 1 | 2 | 1 |
| Remarks | | | | | Comp. | | | | | | | |

The results described in Tables 14 and 15 clearly show that the ink set of the present invention exhibits excellent performances such as abrasion resistance and adhesiveness, in case of printing onto soft polyvinylchloride as recording medium, compared to the comparative inks. Further, these performances were more enhanced in the case of drying with heating than the case of drying at room temperature.

What is claimed is:

1. An inkjet ink comprising at least water, a pigment, a resin, a water-soluble organic solvent, and a surfactant, wherein
    the resin consists of a copolymer resin synthesized from only (meth)acrylic monomers, and
    the copolymer resin has an acid value of not less than 50 mgKOH/g and not more than 200 mgKOH/g, a glass transition temperature (Tg) not less than 20° C. and not more than 100° C., and a weight-average molecular weight (Mw) not less than 20,000 and not more than 100,000.

2. The inkjet ink of claim 1, wherein the (meth)acrylic monomers are selected from the group consisting of (a) methyl methacrylate, (b) acrylic ester or methacrylic alkyl ester having alkyl group of 2-8 carbons and (c) acidic (meth)acrylic monomer.

3. The inkjet ink of claim 1, wherein
    the (meth)acrylic monomers are selected from the group consisting of (a) methyl methacrylate, (b) acrylic ester and (c) acidic (meth)acrylic monomer, and
    the copolymer resin has an acid value of not less than 50 mgKOH/g and not more than 150 mgKOH/g, and a glass transition temperature (Tg) not less than 30° C. and not more than 100° C.

4. The inkjet ink of claim 2, wherein
    the acrylic ester has not less than 5 and not more than 14 carbons, and
    the acidic (meth)acrylic monomer is acrylic acid or methacrylic acid.

5. The inkjet ink of claim 2, wherein
    the acrylic ester is at least one selected from a group of ethyl acrylate, n-butyl acrylate, i-butyl acrylate or 2-ethylhexyl acrylate.

6. The inkjet ink of claim 2, wherein
    a mass of the acrylic ester is not less than 5% by mass and not more than 45% by mass based on a total mass of raw monomers for synthesizing the copolymer resin.

7. The inkjet ink of claim 1, wherein
    a ratio of mass of the copolymer resin to the pigment is not less than 1 and not more than 20.

8. The inkjet ink of claim 1 comprising amines having boiling point of not less than 100° C. and not more than 200° C. in an amount of not less than 0.2% by mass and not more than 2% by mass.

9. The inkjet ink of claim 1, wherein
the (meth)acrylic monomers are selected from the group consisting of (a) methyl methacrylate, (b) methacrylic alkyl ester having alkyl group of 2-8 carbons and (c) acidic (meth)acrylic monomer.

10. The inkjet ink of claim 2, wherein
the methacrylic alkyl ester having alkyl group of 2-8 carbons is at least one selected from a group of ethyl methacrylate, n-butyl methacrylate, i-butyl methacrylate, t-butyl methacrylate and 2-ethylhexyl methacrylate.

11. The inkjet ink of claim 9, wherein
a total mass of the methacrylic alkyl ester having alkyl group of 2-8 carbons and methyl methacrylate is not less than 80% by mass and less than 90% by mass based on a total mass of the copolymer resin.

12. The inkjet ink of claim 9 comprising a water soluble alkanol amine in an amount of not less than 0.3% by mass and not more than 2.0% by mass.

13. The inkjet ink of claim 9, wherein
a monomer composition for synthesizing the copolymer resin has a total mass of methacrylic alkyl ester having alkyl group of 2-8 carbons, methyl methacrylate, and acidic (meth)acrylic monomer in an amount of not less than 80% by mass and not more than 100% by mass based on a total mass of the copolymer resin.

14. The inkjet ink of claim 1, wherein
the surfactant is silicone based or fluorine based surfactant.

15. An inkjet recording method comprising steps of:
printing the inkjet ink of claim 1 onto a non-water-absorption recording medium heated at not less than 35° C. and less than 55° C., and
heat-drying the printed inkjet ink at not less than 55° C. and not more than 90° C.

* * * * *